(12) United States Patent
Vouin et al.

(10) Patent No.: US 9,767,846 B2
(45) Date of Patent: Sep. 19, 2017

(54) SYSTEMS AND METHODS FOR ANALYZING AUDIO CHARACTERISTICS AND GENERATING A UNIFORM SOUNDTRACK FROM MULTIPLE SOURCES

(71) Applicant: Evergig Music S.A.S.U., Paris (FR)

(72) Inventors: Florent Vouin, Paris (FR); Nicolas Lapomarda, Paris (FR); Hippolyte Pello, Paris (FR)

(73) Assignee: FREDERICK MWANGAGUHUNGA, New York, NY (US)

( * ) Notice: Subject to any disclaimer, the term of this patent is extended or adjusted under 35 U.S.C. 154(b) by 7 days.

(21) Appl. No.: 14/697,927

(22) Filed: Apr. 28, 2015

(65) Prior Publication Data

US 2015/0310870 A1    Oct. 29, 2015

Related U.S. Application Data

(60) Provisional application No. 61/985,698, filed on Apr. 29, 2014.

(51) Int. Cl.
| | |
|---|---|
| *G10L 19/00* | (2013.01) |
| *G10L 21/00* | (2013.01) |
| *G11B 27/031* | (2006.01) |
| *G11B 27/28* | (2006.01) |

(52) U.S. Cl.
CPC ............ *G11B 27/031* (2013.01); *G11B 27/28* (2013.01)

(58) Field of Classification Search
None
See application file for complete search history.

(56) References Cited

U.S. PATENT DOCUMENTS

| | | | |
|---|---|---|---|
| 8,190,420 B2* | 5/2012 | Kadirkamanathan | G10L 15/005 704/2 |
| 8,286,218 B2* | 10/2012 | Pizzurro | H04N 21/64322 705/27.1 |

(Continued)

*Primary Examiner* — Satwant Singh
(74) *Attorney, Agent, or Firm* — Norris McLaughlin & Marcus P.A.

(57) ABSTRACT

Systems and methods analyze audio characteristics of digital audio files and generate a uniform soundtrack based on more than one of the digital audio files. The systems and method comprise equalizing a content of each input digital audio file such that all input digital audio files are processible as a group, wherein the input digital audio files are storable in a database and comprise a list of original recorded digital audio files from original recorded digital video files that were recorded from at least two different digital sources at the same event and the input digital audio files have previously been synchronized such that exact locations of the input digital audio files within the same event has been determined or identified. Moreover, the systems and methods comprise analyzing audio characteristics of the input digital audio files to detect a content quality of each input digital audio file, retrieving highest possible content qualities of the input digital audio files by cleaning the input digital audio files, and generating a unified soundtrack for one or more portions of the same event by merging more than one of the input digital audio files into an output digital audio file.

20 Claims, 24 Drawing Sheets

(56) References Cited

U.S. PATENT DOCUMENTS

| | | | | |
|---|---|---|---|---|
| 8,369,974 | B2* | 2/2013 | Daisy | G06F 3/0488 |
| | | | | 700/94 |
| 8,847,053 | B2* | 9/2014 | Humphrey | G09B 5/065 |
| | | | | 434/308 |
| 9,201,588 | B2* | 12/2015 | Daisy-Cavaleri | G06F 3/0488 |
| 9,489,122 | B2* | 11/2016 | Daisy-Cavaleri | G06F 3/0488 |
| 9,536,531 | B2* | 1/2017 | Morrell | G10L 19/008 |
| 2007/0255570 | A1* | 11/2007 | Annaz | G09B 19/06 |
| | | | | 704/270 |
| 2010/0226620 | A1* | 9/2010 | Sim | G11B 27/034 |
| | | | | 386/285 |
| 2011/0150428 | A1* | 6/2011 | Eggink | G11B 27/034 |
| | | | | 386/285 |
| 2013/0231761 | A1* | 9/2013 | Eronen | G10L 25/54 |
| | | | | 700/94 |
| 2014/0029766 | A1* | 1/2014 | Gebauer | H04R 3/00 |
| | | | | 381/119 |
| 2015/0044652 | A1* | 2/2015 | Humphrey | G09B 5/065 |
| | | | | 434/250 |
| 2015/0279424 | A1* | 10/2015 | Marck | G06F 17/30 |
| | | | | 386/285 |
| 2015/0279426 | A1* | 10/2015 | Maurer | G11B 27/28 |
| | | | | 386/241 |
| 2015/0333855 | A1* | 11/2015 | Gebauer | H04R 3/00 |
| | | | | 381/119 |
| 2016/0035386 | A1* | 2/2016 | Morrell | G10L 19/008 |
| | | | | 700/94 |

* cited by examiner

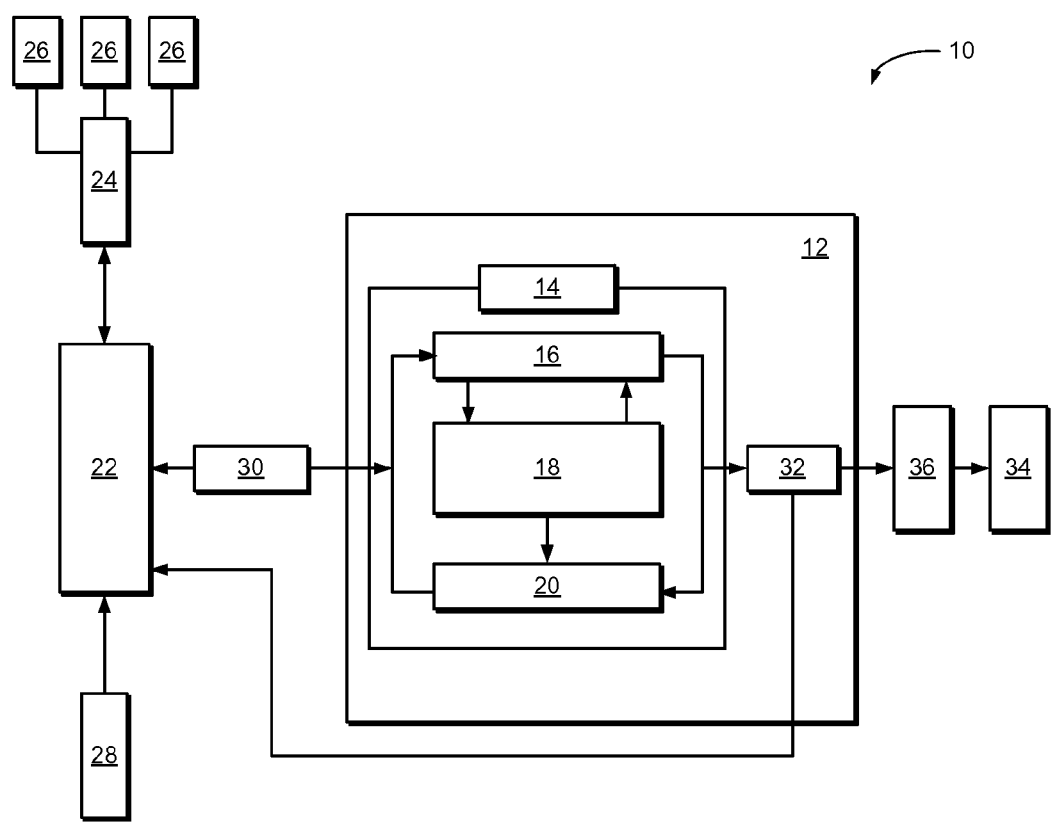
F I G. 1

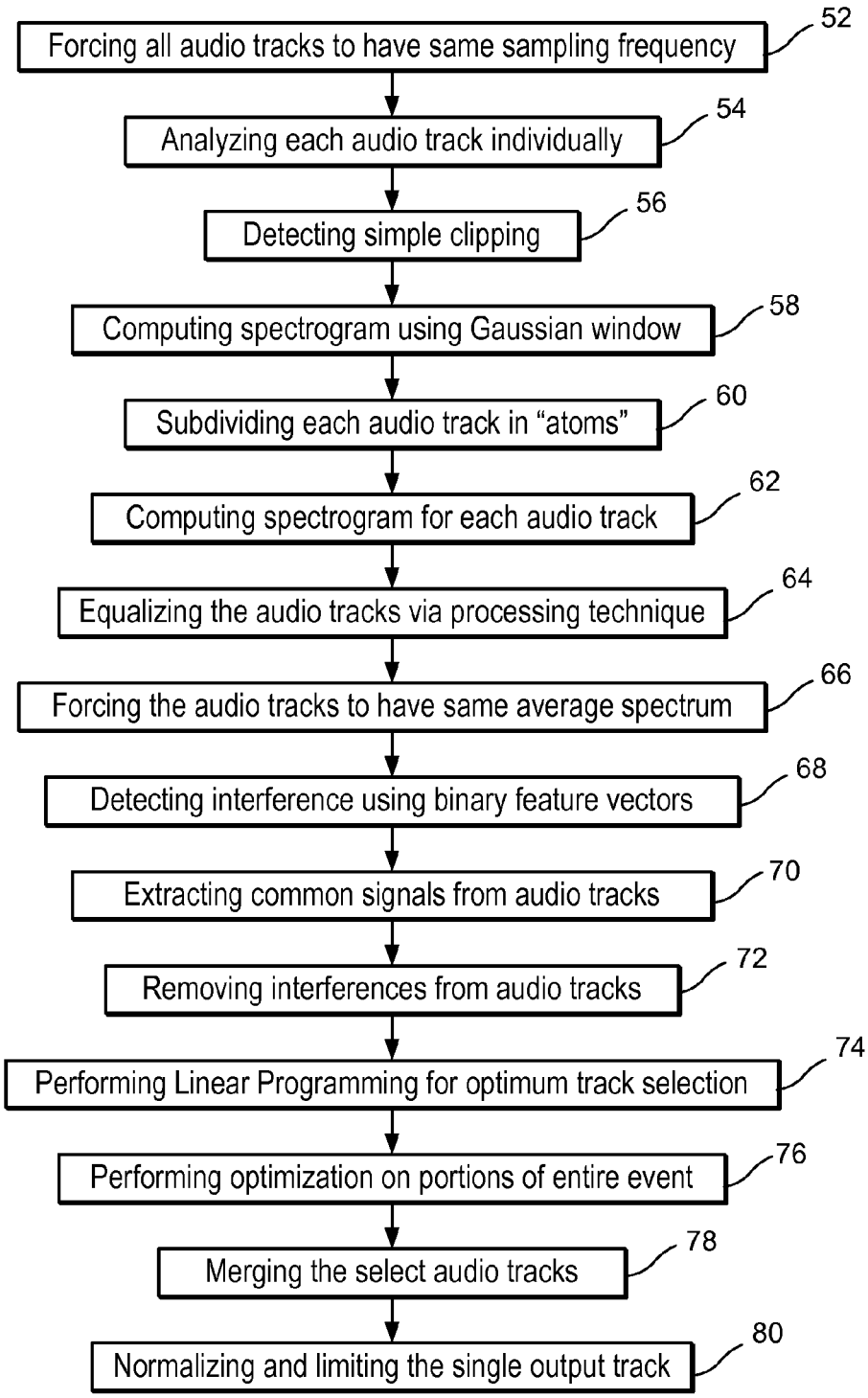
F I G. 2

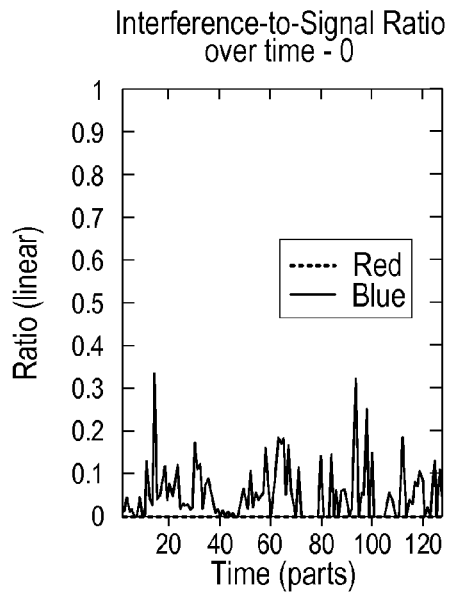
F I G. 10-3A
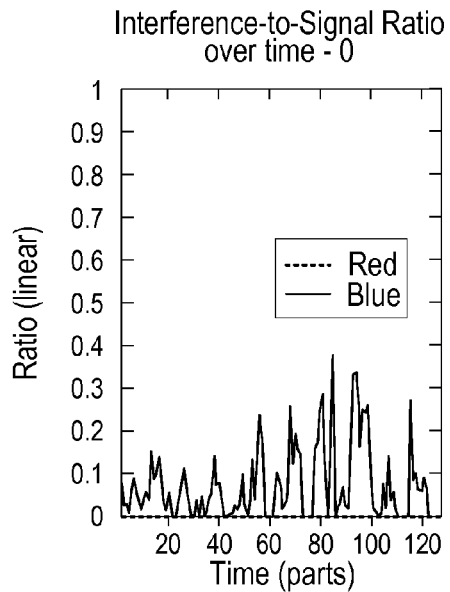
F I G. 10-3B
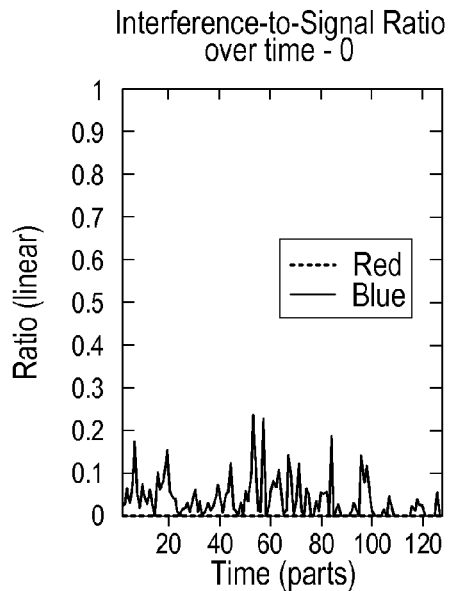
F I G. 10-3C
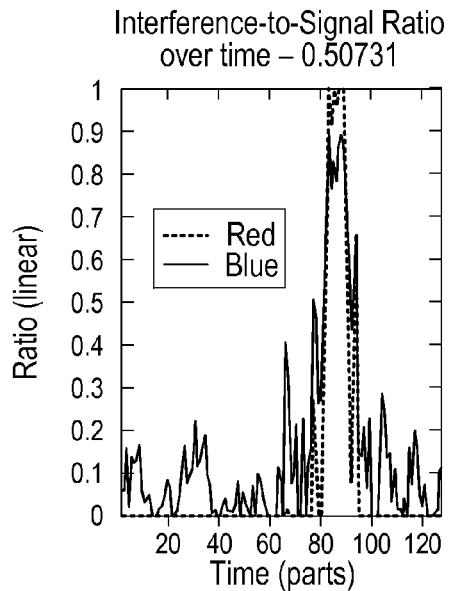
F I G. 10-3D

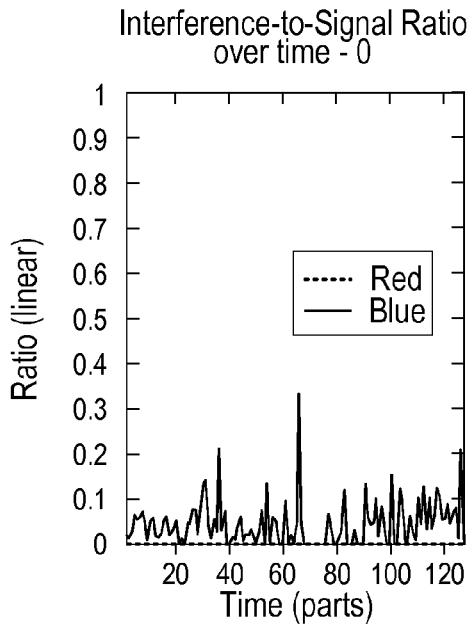
F I G. 10-3E
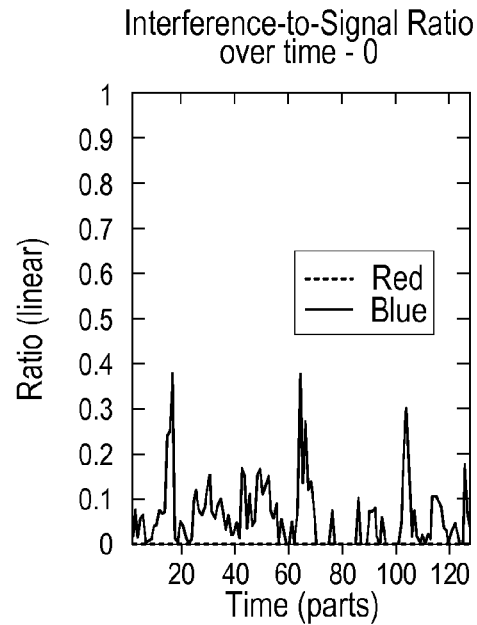
F I G. 10-3F
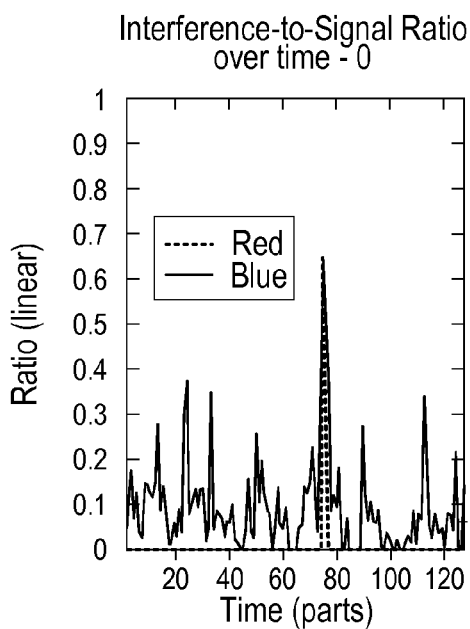
F I G. 10-3G
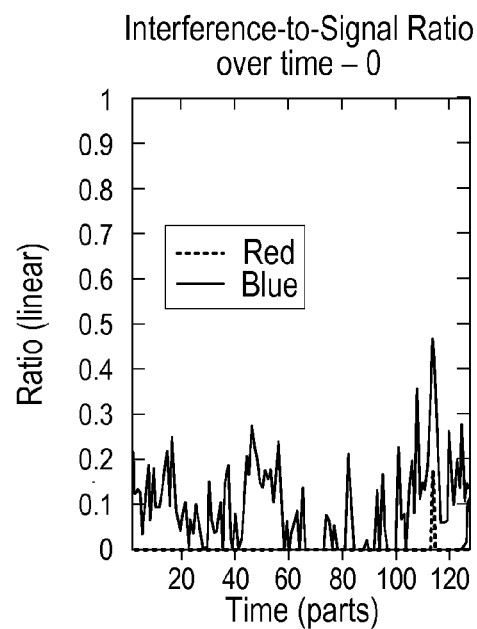
F I G. 10-3H

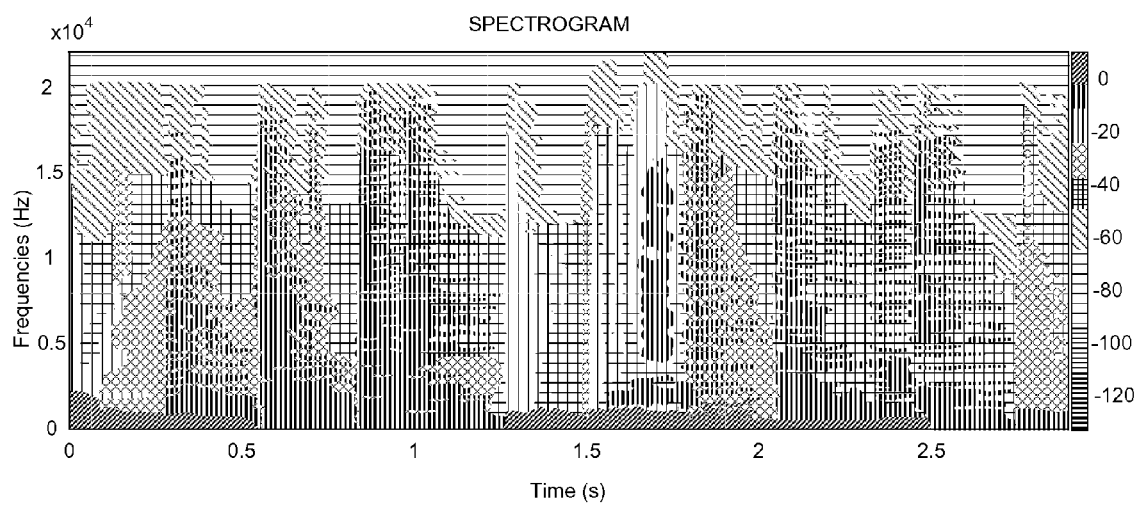
F I G. 11A

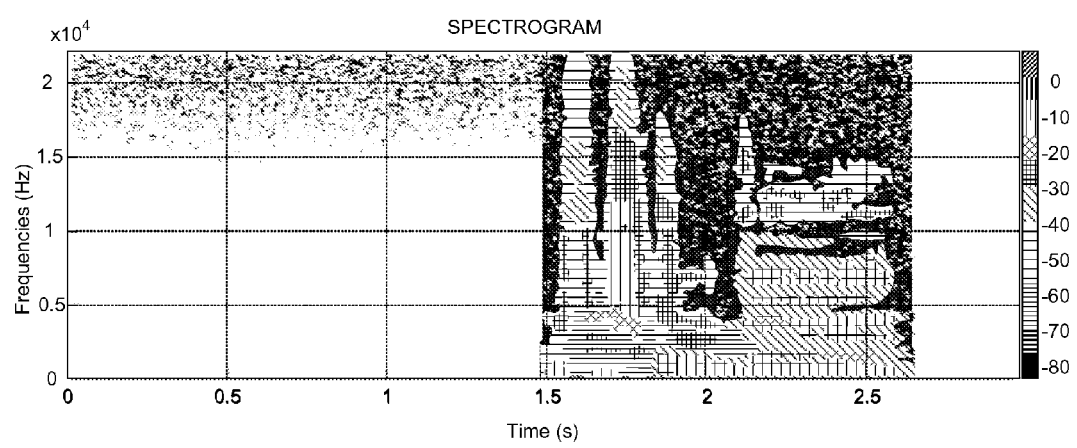
F I G. 12B

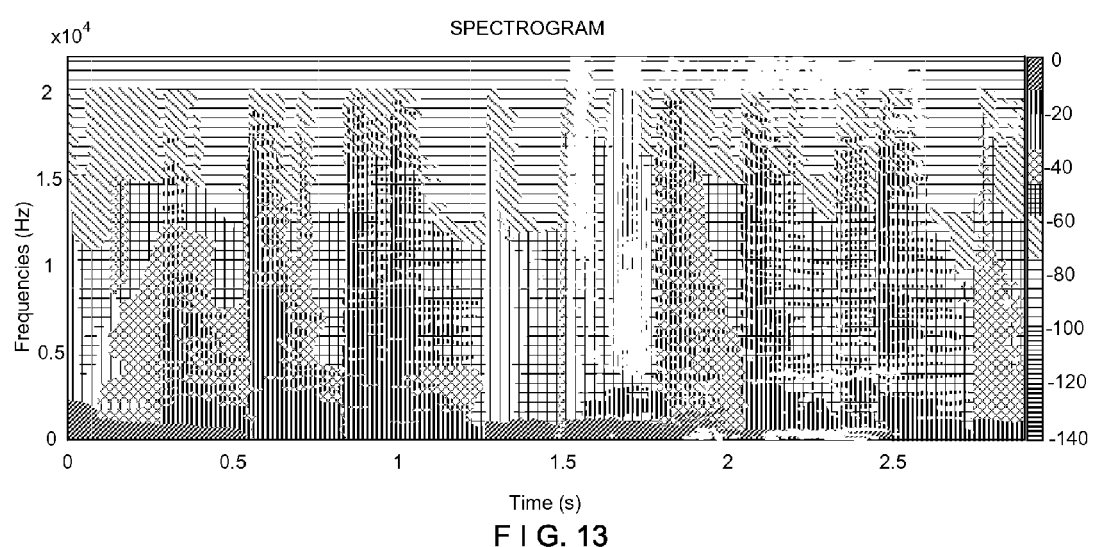
F I G. 13

The Kronecker product is defined as:

$$A \otimes B = \begin{bmatrix} A_{1,1}B & \cdots & A_{1,n}B \\ \vdots & \ddots & \vdots \\ A_{n,1}B & \cdots & A_{n,n}B \end{bmatrix}$$

The equality constraint of the LP problem is:

$$A_{eq} = \begin{bmatrix} I_{N_{atoms}+N_{stable}-1} \otimes 1_{1,J} & 0_{N_{atoms}+N_{stable}-1, J(N_{atoms}-1)} & 0_{N_{atoms}+N_{stable}-1, N_{atoms}-N_{stable}} \\ X_{previous} & 0_{N_{stable}-1, JN_{atoms}} & 0_{N_{stable}-1, J(N_{atoms}-1)} & 0_{N_{stable}-1, N_{atoms}-N_{stable}} \end{bmatrix}$$

$$b_{eq}^T = \begin{bmatrix} 1_{1,N_{atoms}} & 1_{1,N_{stable}-1} \end{bmatrix}$$

where Xprevious is the Nstable − 1 × J (Nstable − 1) matrix of the last choices of the previous optimisation.

The only non-zero elements are for each time nprevious ∈ [1, AT for the corresponding selected $$X_{previous}\left[n_{previous}, (n_{previous}-1)J + j_{selected}\right] = 1$$

The inequality constraint contains the definition of the slack variables ej,n and en. A is equal to:

$$\begin{bmatrix} -1 & 0_{1,J-1} & 1 & 0_{1,J-1} & 0_{1,J(N_{atoms}+N_{stable}-3)} & -1 & 0_{1,J-1} & 0_{1,J(N_{atoms}+N_{stable}-3)} & & 0_{1,N_{atoms}-1} \\ 1 & 0_{1,J-1} & -1 & 0_{1,J-1} & 0_{1,J(N_{atoms}+N_{stable}-3)} & -1 & 0_{1,J-1} & 0_{1,J(N_{atoms}+N_{stable}-3)} & & 0_{1,N_{atoms}-1} \\ & \ddots & & & & & \ddots & & & \vdots \\ 0_{1,J(N_{atoms}+N_{stable}-3)} & 0_{1,J-1} & -1 & 0_{1,J-1} & 1 & 0_{1,J(N_{atoms}+N_{stable}-3)} & 0_{1,J-1} & -1 & & 0_{1,N_{atoms}-1} \\ 0_{1,J(N_{atoms}+N_{stable}-3)} & 0_{1,J-1} & 1 & 0_{1,J-1} & -1 & 0_{1,J(N_{atoms}+N_{stable}-3)} & 0_{1,J-1} & -1 & & 0_{1,N_{atoms}-1} \\ & & 0_{1,J(N_{atoms}+N_{stable}-1)} & & & & 0.5 \times 1_{1,JN_{stable}} & 0_{1,J(N_{atoms}-2)} & & \\ & & \vdots & & & & & \ddots & & -(N_{stable}-1)1_{N_{atoms}-1} \\ & & 0_{1,J(N_{atoms}+N_{stable}-1)} & & & & 0_{1,J(N_{atoms}-2)} & 0.5 \times 1_{1,JN_{stable}} & & \end{bmatrix}$$

$$b^T = \begin{bmatrix} 0_{1,2J(N_{atoms}+N_{stable}-2)} & 1_{1,N_{atoms}-1} \end{bmatrix}$$

FIG. 14

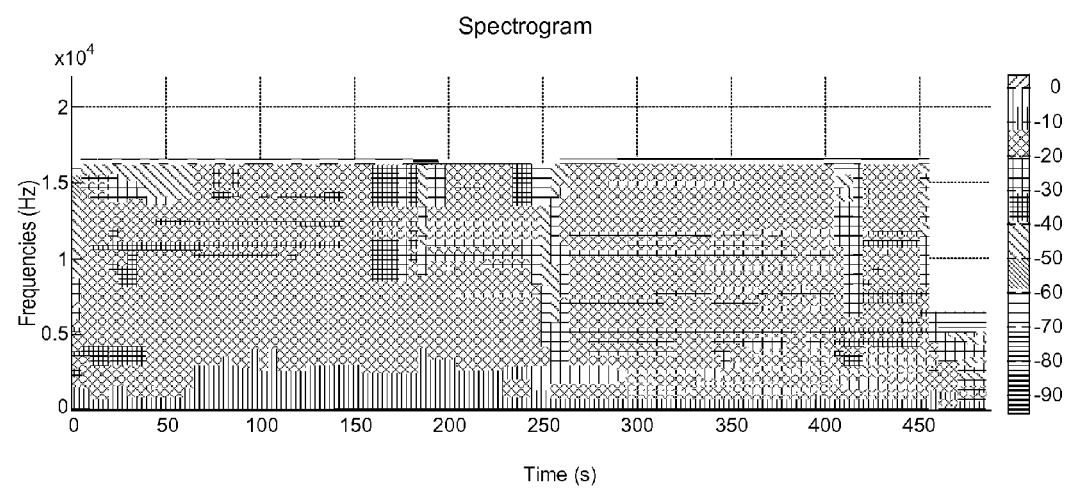
F I G. 16

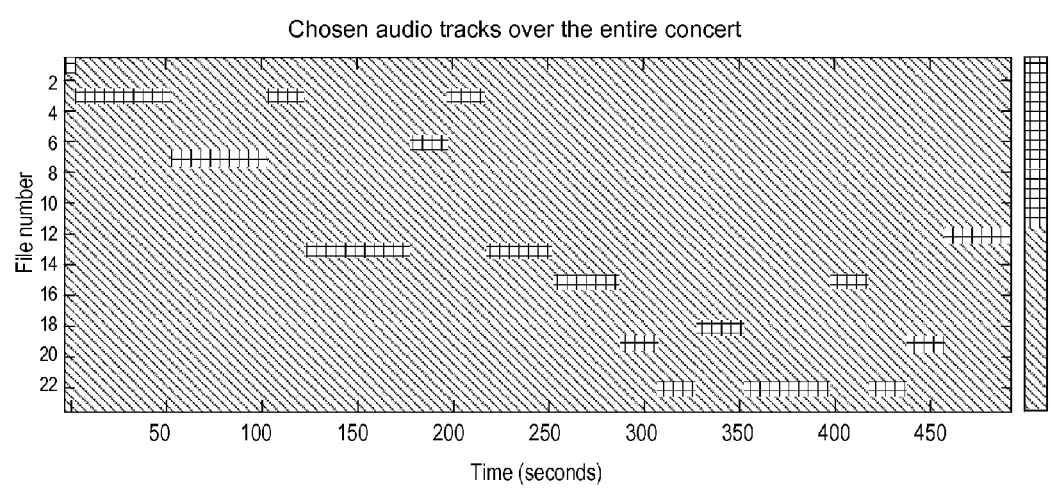
F I G. 18

SYSTEMS AND METHODS FOR ANALYZING AUDIO CHARACTERISTICS AND GENERATING A UNIFORM SOUNDTRACK FROM MULTIPLE SOURCES

CROSS REFERENCE TO RELATED APPLICATION

This application is a non-provisional application claiming the benefit under 35 U.S.C. 119(e) of U.S. Provisional Patent Application No. 61/985,698, filed on Apr. 29, 2014, which is incorporated herein by reference in its entirety.

FIELD OF DISCLOSURE

The present systems and methods analyze audio characteristics and generate a uniform soundtrack from multiple sources. The systems and methods utilize recorded audio tracks, from multiple sources, that have previously been synchronized such that the precise location of the recorded audio tracks within an entire event, that previously occurred, is known, determined and identified. The inventive systems and methods are configured or adapted to generate a unified soundtrack for each portion of the entire event from the recorded and synchronized audio tracks. The inventive systems and methods implement and/or execute one or more computer algorithms and/or computer software to analyze audio characteristics of the recorded and synchronized audio tracks and generate the unified soundtrack of the entire event from the recorded and synchronized audio tracks.

The recorded and synchronized audio tracks are derived from audio and/or video signals recorded by at least two different users recording the same or different portions of the same event with different digital mobile devices. As a result, the original audio and/or video signals are generated, created or recorded from multiple sources (i.e., the digital mobile devices of the at least two different users). The recorded and synchronized audio tracks may contain, comprise or include one or more kinds of artefacts therein. The kinds of artefacts include compression (i.e., advance audio coding, hereinafter "AAC")), saturation/distortion, noise, perturbations and/or combinations thereof.

In embodiments, the inventive systems and methods are configured or adapted to generate or create a single audio track of an entire event which may be the same or substantially the same as original audio signal provided at or during the entire event when the event was recorded by multiple sources. To achieve the same or substantially the same audio signal as the original audio signal provided during the entire event, the inventive systems and methods are configured or adapted to detect the quality of each recorded and synchronized audio track using different criteria, equalize the content of the recorded and synchronized audio tracks so to be able to process recorded and synchronized audio tracks as a group, clean the recorded and synchronized audio tracks to retrieve the recorded audio signals at their highest possible quality, and merge the recorded and synchronized audio tracks as a single audio track while creating as few discontinuities therein as possible.

SUMMARY OF THE DISCLOSURE

In embodiments, the present systems and methods may analyze audio characteristics of digital audio files and generate a uniform soundtrack based on more than one of the digital audio files. The systems and methods may comprise equalizing a content of each input digital audio file such that all input digital audio files are processible as a group, wherein the input digital audio files are storable in a database and comprise a list of original recorded digital audio files from original recorded digital video files that were recorded from at least two different digital sources at the same event and the input digital audio files have previously been synchronized such that exact locations of the input digital audio files within the same event has been determined or identified, analyzing audio characteristics of the input digital audio files to detect a content quality of each input digital audio file, retrieving highest possible content qualities of the input digital audio files by cleaning the input digital audio files, and generating a unified soundtrack for one or more portions of the same event by merging more than one of the input digital audio files into an output digital audio file.

In an embodiment, one or more discontinuities within the output digital audio file are minimized.

In an embodiment, the input digital audio files are contained within digital multimedia files that further comprise digital video files that have been previously synchronized with respect to each other.

In an embodiment, the systems and methods may further comprise providing a database comprising the input digital audio tracks.

In an embodiment, the systems and methods may further comprise storing the output digital audio track in a database or a digital memory device.

In an embodiment, the systems and methods may further comprise detecting one or more artefacts within one or more of the input digital audio files while analyzing the audio characteristics of the input digital audio files, wherein the one or more artefacts are selected from the group consisting of compression, saturation/distortion, noise, perturbations and combinations thereof.

In an embodiment, the systems and methods may further comprise forcing, while equalizing the content, all input digital audio files to have a same sampling frequency.

In embodiments, the present systems and methods for analyzing audio characteristics of digital audio files recorded at a same event and generating a uniform soundtrack based on more than one of the digital audio files, the systems and methods may comprise accessing input digital audio files that are storable in a database and comprise a list of original recorded digital audio files from original recorded digital video files that were recorded from at least two different digital sources at the same event and the input digital audio files have previously been synchronized such that exact locations of the input digital audio files within the same event has been determined or identified, subdividing each input digital audio file in a plurality of atoms, estimating at least one selected from cut-off frequency and data compression for each atom of each input digital audio file based on the plurality of atoms of each input digital audio file, selecting atoms of the input digital audio files for generating an output digital audio file based on determined optimization windows for each atom of each input digital audio file, and generating at least one portion of the uniform soundtrack by merging the selected atoms of the input digital audio files into the output digital audio file.

In an embodiment, the systems and methods may further comprise determining the optimization windows for each atom of each input digital audio file based on determined optimization costs for each atom, wherein the determined optimization costs are determined by utilizing at least one selected from the estimated cut-off frequency and the estimated data compression for each input digital audio file.

In an embodiment, the systems and methods may further comprise detecting, after each input digital audio file is subdivided, one or more artefacts associated with each atom of each input digital audio file.

In an embodiment, the one or more artefacts are selected from the group consisting of compression, saturation/distortion, noise, perturbations and combinations thereof.

In an embodiment, the systems and methods may further comprise determining a spectrogram of each atom of each input digital audio file.

In an embodiment, the systems and methods may further comprise determining an audio file spectrum of each atom of each input digital audio file based on the determined spectrogram of each atom of each input digital audio file.

In an embodiment, the systems and methods may further comprise estimating a cut-off frequency for each atom of each input digital audio file based on the determined audio file spectrum of each atom of each input digital audio file.

In an embodiment, the systems and methods may further comprise estimating a data compression for each atom of each input digital audio file.

In an embodiment, the determined optimization windows for each atom is based on at least one selected from the estimated cut-off frequency and the estimated data compress for each atom of each input digital audio file.

In an embodiment, the determined optimization windows for each atom is based on a processing technique comprising utilizing all available audio files for each atom in time for decoloring audio signals associated with each atom of each input digital audio file.

In an embodiment, the processing technique further comprises a common signal extraction or an interference detection using at least one binary feature vector.

In an embodiment, the systems and methods may further comprise providing a database comprising the input digital audio files.

In an embodiment, the systems and methods may further comprise storing the output digital audio file in a database or a digital memory device.

DESCRIPTION OF THE DRAWINGS

So that the above recited features and advantages of the present systems and methods can be understood in detail, a more particular description of the present systems and methods, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

FIG. 1 illustrates a block diagram of a computer system for analyzing audio characteristics and/or generating a uniform soundtrack from multiple digital sources in an embodiment.

FIG. 2 illustrates a flowchart of an inventive method for analyzing audio characteristics and/or generating a uniform soundtrack from multiple digital sources in an embodiment.

FIGS. 10-1, 10-2 and 10-3A through 10-3H illustrate three rows of graphs, wherein FIG. 10-1 shows weighted mask $I_j[l,m](1-B[l,m]+1/J)^2$, FIG. 10-2 shows corresponding interference $I_j[l,m](1-B[l,m]+1/J)^{2X}_j[l,m]$, and FIGS. 10-3A through 10-3H show Interference to-Signal ratios ISRj [1] and their thresholded counterpart, whereby, in the fourth file (see FIG. 10-3D), an attendee of the same event screams in the middle of the atom and the last file contains heavily distorted audio(see FIG. 10-3H) in an embodiment.

FIG. 11A illustrates a graph showing an observed signal and FIG. 11B illustrates a graph showing a ground truth common signal in an embodiment.

FIG. 12A illustrates a graph showing estimated interference and FIG. 12B illustrates a graph showing ground truth interference in an embodiment.

FIG. 13 illustrates a graph showing a retrieved common signal wherein $g_{Wiener}=2$ in an embodiment.

FIG. 14 illustrates linear programming matrices in an embodiment.

FIG. 16 illustrates an estimated average spectrum $X_{avg}[n, m]_{dB}$ for two songs with atoms n of 5 seconds, wherein white parts correspond to the frequencies that are over the cut-off of all the files, in an embodiment.

FIG. 18 illustrates a graph showing binary choices $x_{j,n}$ indicating the chosen file for each atom in an embodiment.

DETAILED DESCRIPTION OF THE DISCLOSURE

The present systems and/or methods comprise techniques and/or tools for analyzing audio characteristics of recorded and synchronized digital audio tracks and/or generating a uniform soundtrack from the recorded and synchronized digital audio tracks that were recorded by multiple digital sources. The digital audio tracks may previously recorded digital audio tracks recorded by at least two digital mobile devices. The techniques and/or tools utilized by the present systems and/or methods may be in the form of at least one selected from computer-implemented steps, algorithms and/or or software that analyze the audio characteristics and/or generate the uniform soundtrack when executed by one or more microprocessors associated with the present system and/or methods.

Figures 1, 10:
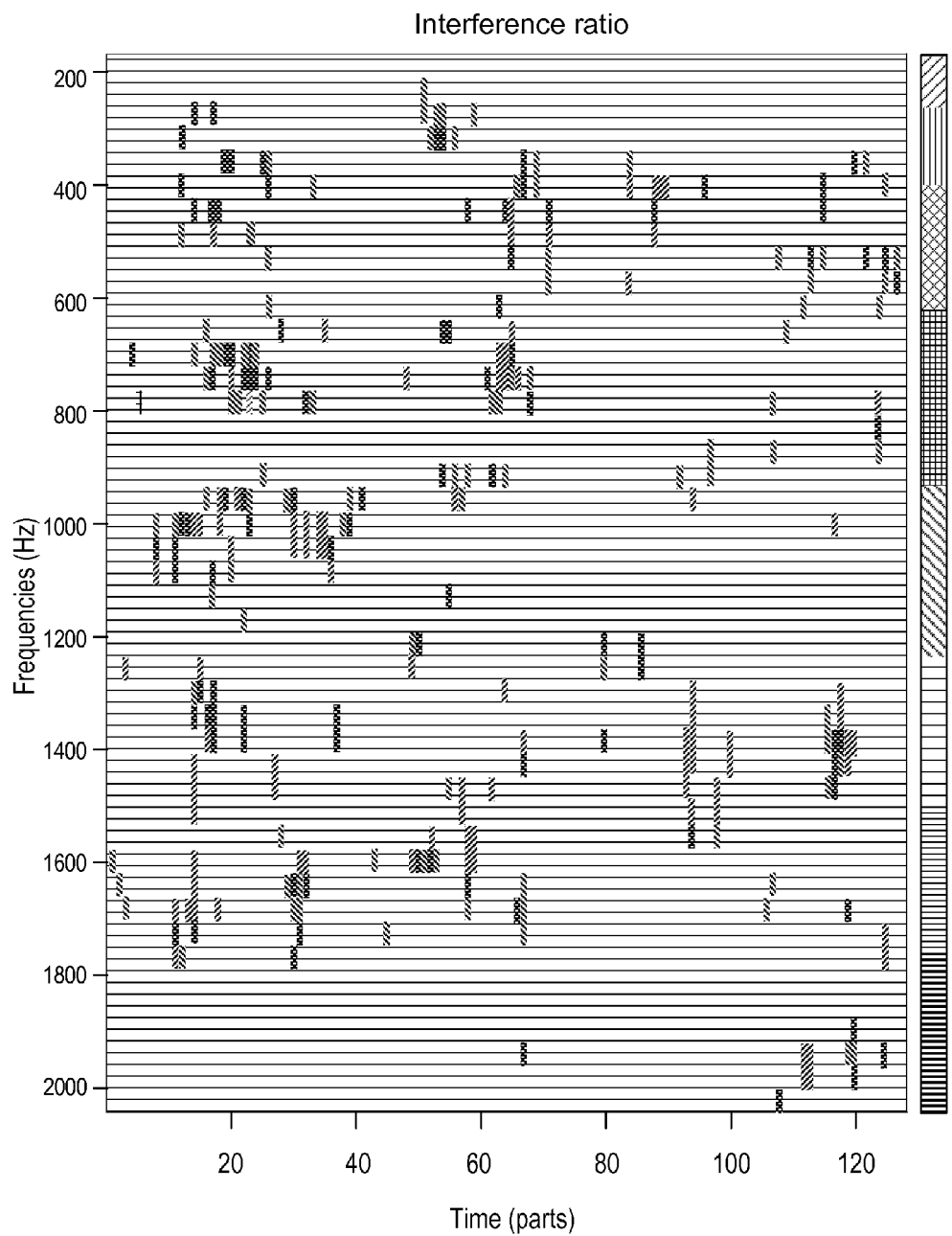

Referring now to the drawings wherein like numerals refer to like parts, FIG. 1 shows a computer system 10 (hereinafter "system 10") configured and/or adapted to analyze audio characteristics and generate a uniform soundtrack from digital audio tracks recorded by multiple digital sources present during an entire event (hereinafter "the same event") that previously occurred. The same event may be, for example, a musical concert, an entertainment event, a political event, a sports event, a conference and/or the like.

It should be understood that the present disclosure should not be deemed as limited to a specific embodiment of the same event.

The system 10 comprises at least one computer 12 (hereinafter "computer 12") which comprises at least one central processing unit 14 (hereinafter "CPU 14") having at least one control unit 16 (hereinafter "CU 16"), at least one arithmetic logic unit 18 (hereinafter "ALU 18") and at least one memory unit (hereinafter "MU 20"). One or more communication links and/or connections, illustrated by the arrowed lines within the CPU 14, allow or facilitate communication between the CU 16, ALU 18 and MU 20 of the CPU 14. One or more computer-implemented steps, algorithms and/or computer software (hereinafter "software") for analyzing audio characteristics and generating a uniform soundtrack from audio tracks recorded by multiple sources at the same event is uploaded and stored on a non-transitory storage medium (not shown in the drawings) associated with the MU 20 of the CPU 14.

The system 10 may further comprise a database server 22 (hereinafter "server 22") and a database 24 which may be local or remote with respect to the computer 12. The computer 12 may be connected to and in digital communication with the server 22 and/or the database 24, as illustrated by the arrowed lines extending between the computer 12 and the server 22 and between the server 22 and the database 24. In an embodiment not shown in the drawings, the server 22 may be excluded from the system 10 and the computer 12 may be directly connected to and in direct communication with the database 24. A plurality of digital media files and/or data files 26 (hereinafter "data files 26") are stored within the database 24 which are accessible by and transferable to the computer 12 via the server 22 or via a direct communication link (not shown in the drawings) between the computer 12 and the database 24 when the server 22 is excluded from the system 10.

The data files 26 stored in the database 24 comprise audio files, video files and/or multimedia files. The audio files comprise recorded and synchronized audio tracks, the video files comprise recorded and synchronized video tracks, and the recorded and synchronized audio and video tracks are recorded audio and video signals of one or more portions of the same event that have previously been synchronized. The one or more portions of the same event may be one or more durations of time that occurred between a beginning and an end of the same event. In embodiments when the data files 26 are multimedia files, the multimedia files contain a combination of different content forms, such as, for example, recorded and synchronized audio and video tracks. The recorded and synchronized audio and/or video tracks were previously synchronized such that precise locations of the recorded audio tracks within a timeline of the entire event are known, determined and identified.

The recorded and synchronized audio and/or video signals of the data files 26 were recorded at or during the same event by the at least two different users via different digital mobile devices (i.e., from multiple sources). In embodiments, original recorded audio and video signals from multiple sources may have been uploaded, transferred to or transmitted to the system 10 via at least one digital input device 28 which may be connectible to the system 10 by a communication link or interface as illustrated by the arrowed line in FIG. 1 between server 22 and input device 28. In embodiments, the digital input device 28 may be an augmented reality device, a computer, a digital audio recorder, a digital camera, a handheld computing device, a laptop computer, a mobile computer, a notebook computer, a smart device, a table computer, a wearable computer or combinations thereof The present disclosure should not be deemed as limited to a specific embodiment of the multimedia files and/or the input device 28.

In embodiments, the CPU 14 may access input recorded/synchronized audio tracks 30 which may be stored in and accessible from the database 24. In an embodiment, the CPU 14 may select the input recorded/synchronized audio tracks 30 from the data files 26 stored in the database 24. The CPU 14 may transmit a request for accessing the input recorded/synchronized audio tracks 30 to the server 22, and the server 22 may execute the request and transfer the input recorded/synchronized audio tracks 30 to the CPU 14 of the computer 12. In embodiments, one or more of the audio tracks of the input recorded/synchronized audio tracks 30 may comprise one or more kinds of artefacts, such as, for example, compression (i.e., AAC), saturation/distortion, noise, perturbations and/or combinations thereof.

Figures 2, 10:
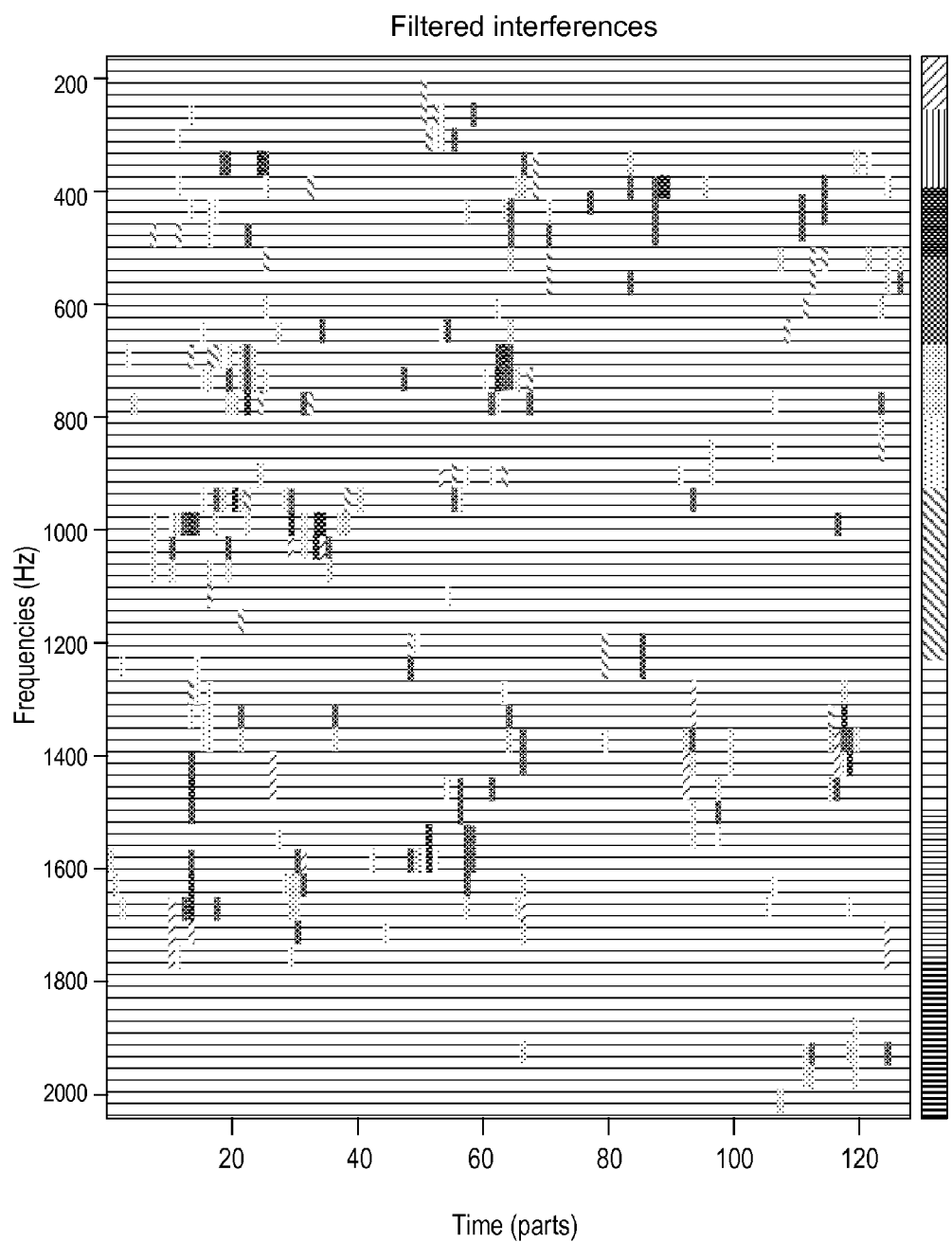

The CPU 14 of the computer 12 may execute or initiate the software stored on the non-transitory storage medium of the MU 20 to perform, execute and/or complete one or more computer-implemented instructions, actions and/or steps associated with a method 50 for analyzing audio characteristics of the input recorded/synchronized audio tracks 30 and generating a uniform soundtrack of the entire event from more than one of the input recorded/synchronized audio tracks 30 recorded from different multiple sources as shown in FIG. 2. As a result, the CPU 14 and/or method 50 may detect the quality of each audio track of the input recorded/synchronized audio tracks 30 using a plurality of different criteria, equalize the content of the input recorded/synchronized audio tracks 30 to be able to process the input recorded/synchronized audio tracks 30 as a group, clean the input recorded/synchronized audio tracks 30 to retrieve the recorded audio signals at their highest possible quality, and merge the input recorded/synchronized audio tracks 30 to generate, create or produce a single audio output track 32 (hereinafter "single output track 32") while creating as few discontinuities therein as possible. The single output track 32 may be the same or substantially the same as the original audio signal provided or generated during the entire event that previously occurred. Additional computer-implemented instructions, actions or steps that are performable or executable by the CPU 14 and software and/or the method 50 are subsequently discussed with respect to the method 50 for analyzing audio characteristics of the input recorded/synchronized audio tracks 30 and generating the single output track 32.

After the single output track 32 is generated, created or produced by the CPU 12, the single output track 32 may be transferred or transmitted to the server 22 which may store the single output track 32. Alternatively, the single output track 32 may be transferred to a memory 34 associated with the computer 12 via communication link 36 that may connect the CPU 14 and the memory 34 such that the CPU 14 may be in communication with the memory 34. The memory 34 may be local or remote with respect to the computer 12. In embodiments, the computer 12, the server 22, the database 24 and/or the memory 34 may be connected and/or in communication with one another via a digital communication network (not shown in the drawings) which may be a wireless network, a wired network or a combination thereof. The digital communication network may be any digital communication network as known to one of ordinary skill in the art.

Upon execution of the software by the CPU 14, the system 10 performs, completes or executes the method 50 for analyzing audio characteristics of the input recorded/synchronized audio tracks 30 and generating the single output track 32.

Firstly, the method 50 forces all audio tracks of the input recorded/synchronized audio tracks 30 to have a same sampling frequency $F_s$ as shown at step 52 of FIG. 2. For example, the method 50 may resampling all audio tracks of the input recorded/synchronized audio tracks 30 to $F_s=44.1$ kHz using, for example, polyphase filters.

Spectrogram-based algorithms of the software can usually handle a small delay between signals (10-20 ms); therefore, synchronization of the audio tracks of the input recorded/synchronized audio tracks 30 does not need to be perfect. The audio tracks of the input recorded/synchronized audio tracks 30 are easily centered and normalized:

$$x[k] \leftarrow x[k] - \frac{1}{L}\sum_{i=0}^{L-1} x[i]$$

$$x[k] \leftarrow \frac{x[k]}{\max_i(|x[i]|)}$$

Typically, compression highly distorts the audio signal or audio track because compression may remove some frequency bins. MP3 and AAC are based on psycho-acoustics that uses the fact that a brain of a listener does not capture some events, for example quiet sounds placed right before or after a loud sound (see N Moreau, "Outils pour la Compression Application à la Compression des Signaux Audio." 2009.) If a bit-rate is set too low, compression creates clearly audible artefacts, that may be often localized in high frequencies. These artefacts create, at best, a "flanger" or "phaser" effect. In a worst case, the artefacts may create strident sounds. During reconstruction (decoding), saturation can also occur. Modeling the distortion introduced by the compression using a simple function is not possible as it is highly non-linear. The distortion introduced may be referred to as f compression (*).

A level of compression may be detected using the metadata, such as, for example, a bit-rate of the original file or the audio track, or by analyzing the spectral composition of the audio signal or the audio track. Detecting the compression without the a priori bit-rate may be useful in several situations. First of all, given the same bit-rate, different algorithms may output files or audio tracks with varying quality. Secondly, if the user edited the video on a computer before uploading it, the audio track may have been, for example, re-encoded using a higher bit-rate, which may have deteriorated or reduced the quality of the file.

Because compression may remove a substantial amount of information from an audio track, compression further may deteriorate the performances of the processing applied to the audio signals or tracks. In a time domain, it may not be possible to distinguish a compressed part of the audio signal or track. However, when processing the audio files or track in the "spectrogram domain", compression may be more visible which may allow or facilitate the compression algorithm to be taken into account and/or considered.

Possible solutions, assuming an infinite number of sources are available, include simply discarding these audio files or tracks upon detection of being overly compressed. The other possible solutions may include enhancing the quality of these audio files or tracks. Techniques exist to recover missing data, such as, for example, Spectral Band Replication as discussed in N Moreau. A more elaborate method may be, for example, NMF/PLCA framework (see Paris Smaragdis, Bhiksha Raj, and Madhusudana Shashanka, "Missing Data Imputation for Time-Frequency Representations of Audio Signals," Journal of Signal Processing Systems, 65(3):361-370, August 2010).

Two kinds of saturation may be observed. A first kind of saturation may be simple clipping wherein an audio signal or track reaches its maximum value several samples in a row. The second kind of saturation may be harder to detect, as it may not directly be visible on the waveform which may be caused by mechanical/acoustic effects, such as, for example, a membrane may not move quickly enough to reproduce variation of the air pressure. Unfortunately this can be confused for a "legitimate" waveform. Assuming that the audio signal or track is normalized between ±1, simple clipping may be modeled as a non linear function according to formula (1):

$$f_{clipping}(x) = \begin{cases} x & \text{if } |x| < 1 \\ \text{sign}(x) & \text{otherwise} \end{cases} \quad (1)$$

Simple clipping may easily be detected by looking at when the audio signal or track reaches its maximum value for more than 3 samples in a row. The other type of saturation is harder to detect. Even in the case of simple clipping, data compression might distort the signal in a way that clipping is still present although it may not be directly observable by looking at the time audio signal or track. Research on clipping detection after encoding may be advancing although it does not seem to be very effective (see James Eaton and Patrick A. Naylor, "Detection of Clipping in Coded Speech Signals," 2013).

If time-based algorithms are applied to clipped audio signals or tracks by the method 50, performances may decrease because of a non linearity of $f_{clipping}$ (●). Both of these saturations may have little impact when processing several files in the time-frequency (i.e., spectrogram) domain.

A quick observation of effects of these two kinds of non-linearity on the spectrum is at least:

In the first case (clipping), high frequencies contain more energy than usual, due to the abrupt change in the signal caused by limiting it. It may be less smooth and therefore contains more high frequencies.

In the other case, the distortion may be harder to characterize. One possible effect may be that one or several frames will have an abnormally low energy over all frequencies. However distortion may take many other forms.

The following two equations may model a present diversity problem. A complete "processing chain" will be described, although the complete "processing chain" may not necessarily be reverted.

One or more sources of perturbations may be present. For example, one source may include output of the speakers in the venue during the event. Although several speakers may be placed at different locations in the venue during the event, the several speakers may be considered a single source. As a result, a goal may be to obtain $s_1(t)$ or $s_1[k]$ from one or several recordings $x_j[k]$, which also contain other sources $s_i[k]$, $i \neq 1$. This problem is known in the literature as the "Blind Source Separation" problem.

The sensors (i.e., microphones) may be placed at different locations in the venue during the event. Sources also have a specific location in space. As a result, a channel may be modeled between the source i and the sensor j as a filter $h_{ij}$. Any specific form for the channel may not be assumed; therefore, the channel may be modeled as an IIR or FIR filter. These responses may contain the delay $\pi_{ij}$ associated with each source/sensor pair. If needed, the channel response may be expressed as $h_{ij}[k]=h^1_{ij}*\delta[k-\pi_{ij}]$. Without any noise, nor any non linearities, the output of the jth sensor is set forth by equation (2):

$$x_j[k] = \sum_{i=1}^{N_{sources}} h_{ij} * s_i[k] \; \forall \; j \in [1, N_{sensors}] \quad (2)$$

This is typically called the "Convolved Mixtures" model. However, some of the channel responses may be null, as some of the interferences (i.e., talking by attendees of the event) may not be audible from all the sensors.

A simpler version may be the "Delayed Mixtures" model where the channel responses are actually impulses: $h_{ij}[k]=\delta[k-\tau_{ij}]$. For example, the channel response may be composed of several transfer functions. Firstly, the room response, for specific locations of both the source and the sensor, including the delay (in samples) $\tau_{ij}=d_{ij}/c\cdot F_s$, where $d_{ij}$ is the distance between the source and the sensor, and c is the speed of sound. Secondly, the microphone response may include the handset response. In the case of the desired source, such as, for example, the audio signal playing through the speakers, the response of the speakers may also be added.

A complete model may include the addition of noise $n_j$ and the encoding (compression) performed by the digital mobile device, such as, for example, a smart device or a digital camera which may be set forth by equation (3):

$$x_j[k] = f_{compression}\left(\sum_{i=1}^{N_{sources}} h_{ij} * s_i[k] + n_j[k]\right) \; \forall \; j \in [1, N_{sensors}] \quad (3)$$

It should be noted that among an entire system, a sensor response of the digital mobile device may be the most relevant or substantially the most relevant. Often, there are considerable variations in the frequency responses of the smart devices, digital mobile devices that may be used by the attendees of the event to record the event.

A notable point may be that the locations of the sources and/or the sensors may not be known. Although this may seem trivial to mention, it may prevents the utilization of well-known methods for Direction Of Arrival (DOA) estimation, like, for example, the MUSIC algorithm used in telecommunications (see Jason Wee Peng Ng Ng and Athanassios Manikas, "A Space-Diffused Spatial-Temporal ARray (STAR) Receiver for DS-CDMA System," pages 1-22, 2004). Such techniques are based on the assumption that the array of sensors (antennas) is known. Using measured delays between the signals $x_j$, the angles of arrival $\theta_i$ of each source can be estimated. Beamformers may then be constructed using well known methods (Wiener, Super-resolution) to isolate the desired signal. However, it is not possible when the locations of the sources and/or the sensors are unknown. In addition to not knowing the locations of the sources and/or the sensors, it may be highly probable that these locations are not fixed in time which may also limit use of other techniques that estimate the delays of arrival between the sensors even if knowing their locations is not required, such as, for example a DUET algorithm (see Scott Rickard, "The DUET Blind Source Separation," pages 217-237, 2007).

The system 10 and/or the method 50 implement, execute and complete a plurality of different computer algorithms and software for analyzing audio characteristics of the input recorded/synchronized audio tracks 30 and generating the single output track 32. One or more of the plurality of different computer algorithms or software may be executed when analysis may be performed on each audio track independently by method 50 as shown at step 54. One or more of the plurality of different computer algorithms may be directed to multiple audio files or tracks which do not necessarily have a same starting and ending times. One or more of the plurality of different computer algorithms may be directed to common processing which may aims at "normalizing" the audio files or tracks all together and/or may remove undesired sources (i.e., voices of talking attendees) included in the content of the audio files or tracks. Moreover, one or more of the plurality of different computer algorithms or software may be directed to optimizing track selection by solving a linear programming problem and/or merging the audio files or tracks together.

For algorithms that are directed to analyzing each audio file or track independently, simple clipping may be detected, as shown at step 56, in a time signal x [k], a new vector u [k] which is defined according to equation (4):

$$u[k] = \begin{cases} 1 & \text{if } \bigwedge_{i=0}^{I_{min}} |x[k-i]| \geq x_{thresh} \\ 0 & \text{otherwise} \end{cases} \quad (4)$$

where $\Lambda$ is the "logical and" operator. $I_{min}=3$ is the minimum number of consecutive samples over which the signal may be detected as clipped. $x_{thresh}$ is a threshold that adjusts for and/or takes into account samples that are slightly below the maximum value. For long audio signals or tracks, it may be useful to distinguish saturating parts or portions of the audio files or tracks (see the atom decomposition discussed hereafter), to possibly keep the quietest parts or portions of the audio file or track that may be of good quality. To do this, the signal is divided in blocks of fixed length, such as, for example, $L_{block}=T_{block}\times F_s=5$ s$\times$44100 Hz. the ratio of clipping samples is calculated by the method 50. For the nth block according to equation (5):

$$\rho_{clipping}[n] = \frac{1}{L_{block}} \sum_{k=0}^{L_{block}-1} u[n \times L_{block} + k] \quad (5)$$

A few clipped samples may create an audible distortion. A threshold may be applied on equation (5) to determine which blocks are kept. Suggested values are $x_{thresh}=0.99$ and a maximum ratio of $P_{clipping,max}=10^{-3}$ (over which the block should be discarded).

Spectrogram processing is a technique that may be employed for various applications, such as, for example, speech denoising, source separation, and or the like. Spectrogram processing is based on the Short-Time Fourier Transform (STFT). The system 10 and the method 50 may apply the Gabor transform that computes the spectrogram using a Gaussian window as shown at step 58.

From a time signal x[k], the Gabor transform outputs a matrix of coefficients $c_{n,m}$, where n is the time index (i.e., the number of the frame), and m is the frequency index (i.e., frequency bin). The coefficients may be computed using the DFT/FFT according to equation (6):

$$c_{n,m} = \sum_{k=0}^{N_{window}-1} x[n \times N_{shift} + k] \frac{1}{L} g[k] e^{-i2\pi \frac{km}{N_{window}}} \quad (6)$$

Where $N_{window}=1024$ is the length of the window in samples. $g[k]$ is the sampled version of the Gaussian window $g(t)$ according to equations (7) and (8):

$$g[k] = g\left(\frac{k - N_{window}/2}{F_s}\right) k \in 0 \ldots N_{window} - 1 \quad (7)$$

$$g(t) = \frac{1}{\sqrt{2\pi\sigma_t^2}} e^{-\frac{t^2}{2\sigma_t^2}} \quad (8)$$

is the standard deviation of the Gaussian window, which is linked to the time and frequency shifts a and b by the relation:

$$\sigma_t = \sqrt{\frac{a}{4\pi b}}.$$

The time shift is also called the overlap, and is the number of samples between two time windows: $N_{shift}=a \times F_s$. The frequency shift is directly linked to the number of frequency bins, and therefore to the size of the window:

$$b = \frac{F_s}{N_{window}} \cdot L$$

is a normalization factor according to equation (9):

$$L = \sqrt{N_{window} \times \sum_{k=-N_{window}/2}^{N_{window}/2-1} |g(ka)|^2} \quad (9)$$

There exists one more degree of freedom, which is the oversampling factor $$q = \frac{1}{ab}.$$

Choosing the window size $N_{window}$ determines b. a is deduced from q. Boogaart et al. recommends q=5 for high quality audio (see C G v d Boogaart and R Lienhar, "Fast Gabor Transformation for processing high quality audio," 2006). To simplify the processing and be able to manipulate several audio files or tracks at the same time, a is fixed instead of q.

From the $c_{n,m}$ coefficients, the magnitude spectrogram is estimated according to equation (10):

$$X[n,m]_{dB} = 20 \log_{10}(|c_{n,m}|) \quad (10)$$

For real audio signals, only half of the coefficients are necessary for reconstruction. Therefore, $$m \in \left[0, \frac{N_{window}}{2}\right]$$

is processed. Indeed, for $$m > \frac{N_{window}}{2},$$

the coefficients satisfy $c_{n,m}=c^*_{n,N_{window}-m}$

From the $c_{n,m}$ coefficients, the signal is reconstructed by computing the inverse STFT (i.e., inverse Gabor transform) according to equation (11):

$$\tilde{x}[k] = \sum_{n=\left\lceil \frac{k-N_{window}}{N_{shift}} \right\rceil}^{\left\lfloor \frac{k}{N_{shift}} \right\rfloor} \frac{1}{L} g[k - n \times N_{shift}] \sum_{m=0}^{N_{window}-1} c_{n,m} e^{i2\pi \frac{m(k-n \times N_{shift})}{N_{window}}} \quad (11)$$

For q=7, the reconstructed Signal-to-Noise Ratio is around 30-40 dB. The spectrograms computed using the Gabor transform may serve as a basis for most processing as further discussed hereafter.

In an embodiment, such as, for example, a test database, the audio files or tracks may be sampled at 44100 Hz. However, the spectrum of the signals rarely goes up to 22050 Hz (i.e., the Nyquist frequency). This is due both to the quality of the microphones (which are not likely to have a flat frequency response up to 22 kHz) and AAC compression, which removes high frequencies in priority. Moreover, some of the audio files or tracks may have been resampled beforehand (for example during an upload on a social media website, such as, for example, www.youtube.com or www.dailymotion.com, or if the recorded video was previously edited). Thus, the sample rate or bit-rate of the audio file or track may not be relied to determine the actual "cut off" (or Nyquist) frequency of the signal.

By looking at the log-spectrum of the signals $X_i[m]_{dB}=20 \log 10(X_j[m])$, a clear drop of the energies above a given frequency may be observed. One goal is to estimate the frequency at which the drop occurs. To do this, simple thresholding is not used, as it is not robust to variation of loudness between audio files or track, for example. Instead, an algorithm similar to clustering is used. Which frequency best splits lower and higher frequencies may be found, in the sense of variance/entropy minimization. A definition similar to the information gain according to equation (12) may be used:

$$\Gamma^-[\mu] = \frac{\mu+1}{M} \log(\text{Var}(X[m]_{dB})_{m \in [0,\mu]}) + \frac{M-\mu-1}{M} \log(\text{Var}(X[m]_{dB})_{m \in [\mu+1, M-1]}) \quad (12)$$

Here $\Gamma^-$ is a quantity to minimize, and is an opposite of the information gain. The global spectrum of a file $X[m]_{dB}$ is simply computed from the spectrogram $X[n, m]=|c_{n,m}|$ according to equation (13):

$$X[m]_{dB} = 10\log_{10}\left(\frac{1}{N}\sum_n X^2[n, m]\right) \qquad (13)$$

Figure 3:
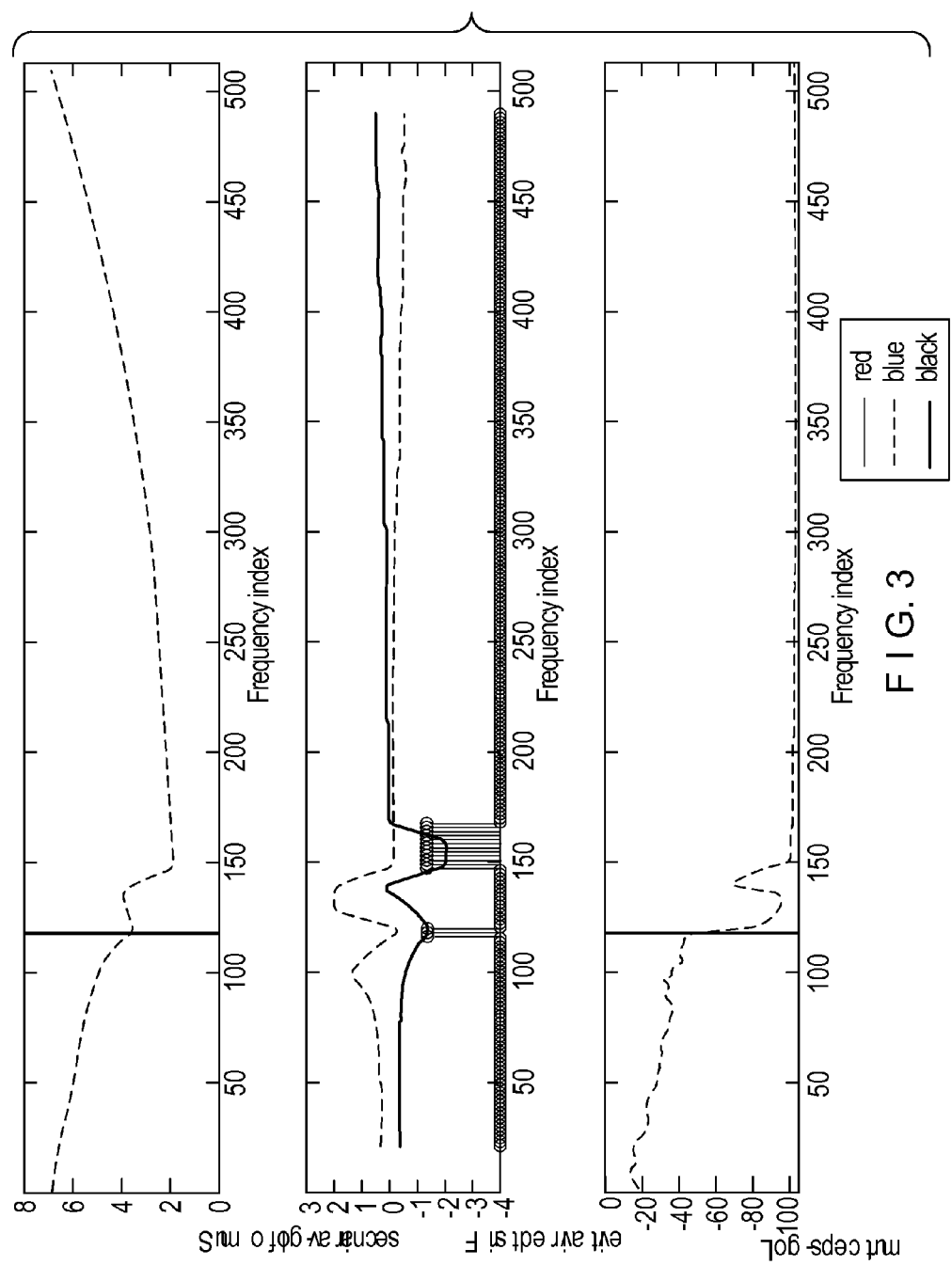
FIG. 3 illustrates graphs of a cut-off frequency for an audio file or track with low bit-rate in an embodiment.

The global minimum of I−[μ] minimizes the information gain; however, it may not be the most appropriate cut-off frequency. For example, the first (as in lowest μ) local minimum of I⁻[μ] may be selected as illustrated in FIG. 3 which may be found or determined by using a simple finite difference derivation; however, it would not be robust potential flat parts of I⁻[μ]. To obtain a less sensible estimator, a threshold $I^-_{localmin}$ is defined and local minima candidates must satisfy equation (14):

$$M = \left\{\mu \;\middle|\; \begin{cases} I^-[\mu - \mu_{localmin}] - I^-[\mu] \geq I^-_{localmin} \\ I^-[\mu + \mu_{localmin}] - I^-[\mu] \geq I^-_{localmin} \\ \mu \in [\mu_{localmin}, M - 1 - \mu_{localmin}] \end{cases}\right\} \qquad (14)$$

where $\mu_{localmin}=20$ (860 Hz) and $I^-_{localmin}=0.05$ were chosen experimentally. FIG. 3 illustrates a cut-off frequency for an audio file or track with low bit-rate. The topmost graph shows opposite of the information gain, I−[μ], the middle graph shows two conditions of equation (14) and the set M of candidates, and the bottommost graph shows the spectrum $X[m]_{dB}$ and the selected cut-off frequency $\mu_{cut\text{-}off}$.

As previously stated, the lowest local minimum was chosen according to equation (15):

$$f_{cut\text{-}off} = \frac{F_s}{2M} \times \mu_{cut\text{-}off} = \frac{F_s}{2M} \times \min_{\mu \in M} \mu \qquad (15)$$

Figure 4:
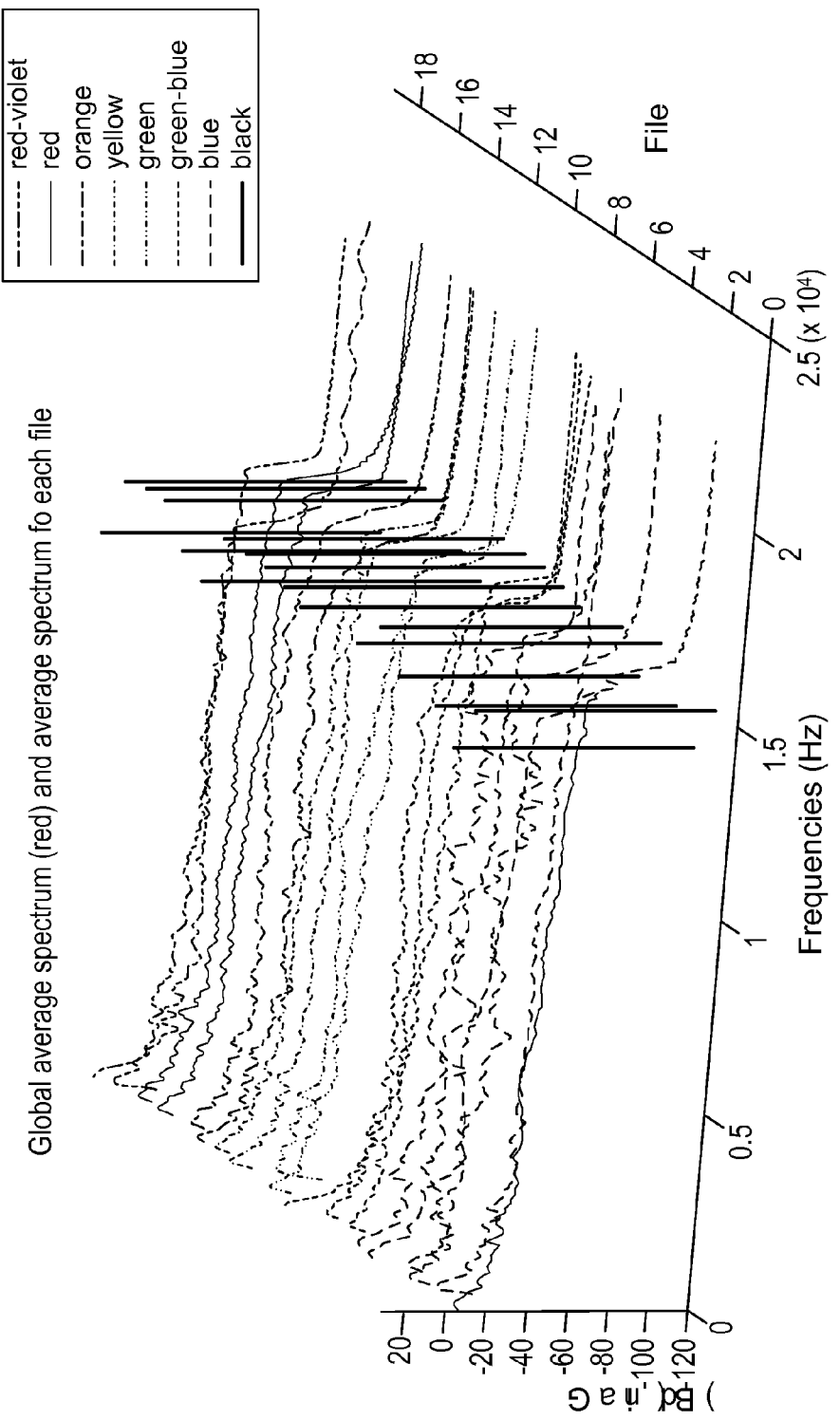
FIG. 4 illustrates a spectra graph of a plurality of audio files or tracks over a 90-second duration in an embodiment.
Figure 5:
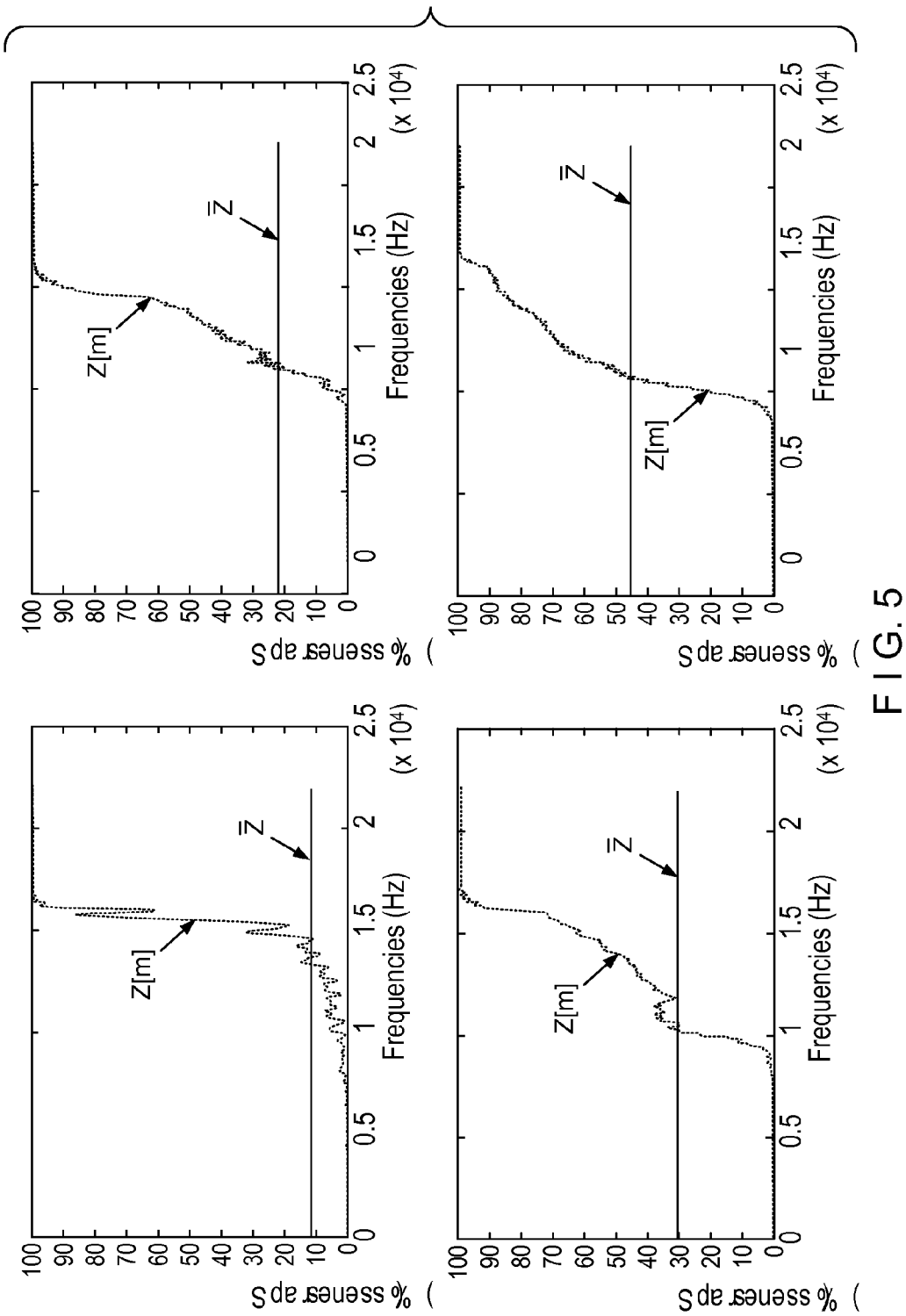
FIG. 5 illustrates graphs showing that more compressed audio files or tracks have higher sparseness in an embodiment.

Examples of estimated cut-off frequencies are presented in FIG. 4 which shows a spectra of 18 audio files or tracks over a 90-second recording along with estimated cut-off frequencies for each audio file or track.

Detecting the cut-off frequency allows for avoiding processing the frequency bins over the limit. For example, these empty high frequencies are not unnecessarily boosted when equalizing the audio files or tracks. A mask of the frequency bins is defined for each file j, according to equation 16, which is utilized during subsequent processing:

$$\mathcal{U}_j[m] = \begin{cases} 1 & \text{for } m \leq \mu_{cut\text{-}off,j} \\ 0 & \text{otherwise} \end{cases} \qquad (16)$$

Still using the spectrograms, an estimate is obtainable of the degradation of the recording caused by data compression. The concept behind this estimate is that compression aims at setting to zero the maximum number of frequency bins in the signal, without causing audible distortion (see Da Luo, Weiqi Luo, Rui Yang, and Jiwu Huang, "Compression History Identification for Digital Audio Signal," 2012 IEEE International Conference on Acoustics, Speech and Signal Processing (ICASSP), pages 1733-1736, March 2012). Therefore by counting the number of frequency bins below a given threshold, a rough estimate of the bit-rate and quality of the audio file or track is obtainable. For a given spectrogram (a whole file or a smaller block), the percentage of zero values in each frequency bin can be expressed, according to equation (17) as:

$$Z[m] = \frac{100}{N}\sum_n \mathbb{1}(X[n, m] < X_0) \qquad (17)$$

$$\forall m \leq \mu_{cut\text{-}off}$$

where $X_0$ is a threshold under which the bin is considered to be 0. Because it is known that AAC/MP3 encoders affect high frequencies in priority, a single estimate of the compression is obtainable by taking the weighted mean of $Z[m]$, giving more influence to high frequencies according to equation (18):

$$\bar{Z} = \frac{1}{\sum_{m=0}^{\mu_{cut\text{-}off}} m} \sum_{m=0}^{\mu_{cut\text{-}off}} mZ[m] \qquad (18)$$

Distortion may be one of the most obvious alteration for the listener of an audio file or track. However, it is hard to estimate because other genuine signals have the same properties (i.e., distorted guitars). Distortion may be caused by the microphone that cannot handle sound pressures over a given level. To detect it, a new spectrogram is computed, with a different window size. In an embodiment, a window of 256 samples and an overlap of 50% may be utilized (i.e.,128 samples). Distortion may be characterized by high variations in the signal energy between two adjacent frames. From this new spectrogram X[n, m], computed with the previous parameters, the energy of each frame is computed, after having removed low frequencies according to equation (19):

$$E[n] = 10\log_{10}\left(\frac{1}{M - \mu_{low}}\sum_{m=\mu_{low}}^{M-1} X[n, m]^2\right) \qquad (19)$$

where $\mu_{low}$ is the closest frequency bin to 1.5 kHz. The difference between two adjacent frames is then computed, using the energy values in decibels according to equation (20):

$$D[n]=E[n+1]-E[n] \qquad (20)$$

Using D[n], parts or portions where this signal oscillates with a high amplitude (i.e., abrupt variations in the energy) may be determined or identified. This is detected by computing the energy (i.e., variance) of a sliding window:

$$O[i]=\text{Var}(\{D[n]\}_{n \in [iS_{energy}, iS_{energy}+L_{energy}-1]})$$

where $S_{energy}=8$ is the step between two windows and $L_{energy}=16$ is the length of the window (expressed in "frame steps" of length 128 samples). A 16-sample window is detected as distorted when the variance is over a given threshold. The real thresholding operation that is performed was designed to be a bit more complex than a binary value:

$$\mathcal{D}[i] = \left(\frac{\max(O^-, \min(O^+, O[i])) - O^-}{O^+ - O^-}\right)^2$$

Here this operation is actually not necessary, as $O^+=20$ and $O^-=19$, but it is kept if the boundaries $O^-$ and $O^+$ are ever changed. Finally, to obtain only one value for the whole signal (for an atom, for example), the average of D over all "energy windows" is utilized according to equation (21):

$$\overline{\mathcal{D}} = \frac{1}{N_{energy}} \sum_i \mathcal{D}[i] \qquad (21)$$

The higher $\overline{\mathcal{D}} \in [0,1]$, the higher the distortion. However, distortion may sometimes be detected in clean audio files or frames. Usually, false positives may occur with a low (but positive) value which may be adjusted for or handled during the computation of the cost function.

Figure 6:
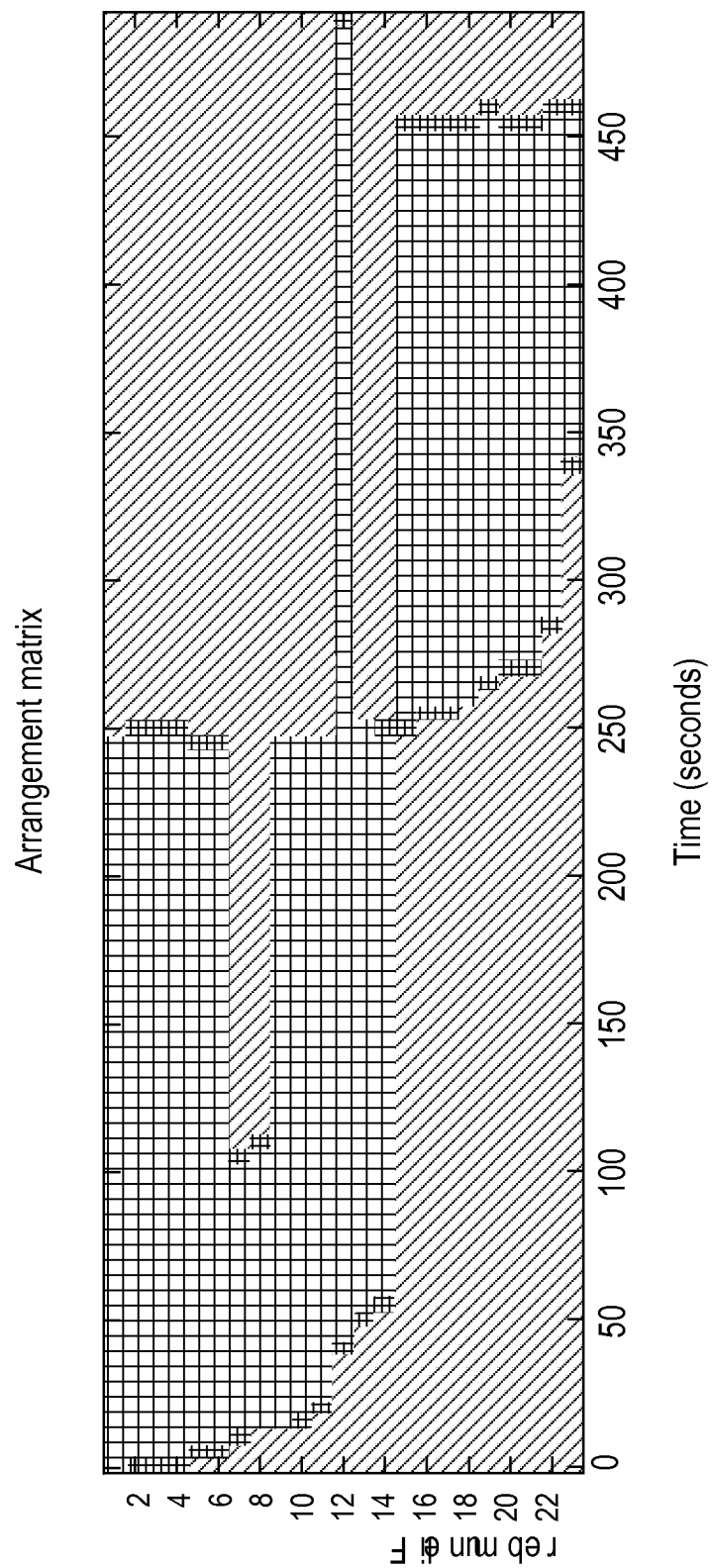
FIG. 6 illustrates an arrangement matrix A for 2 songs in an embodiment.
Figure 7:
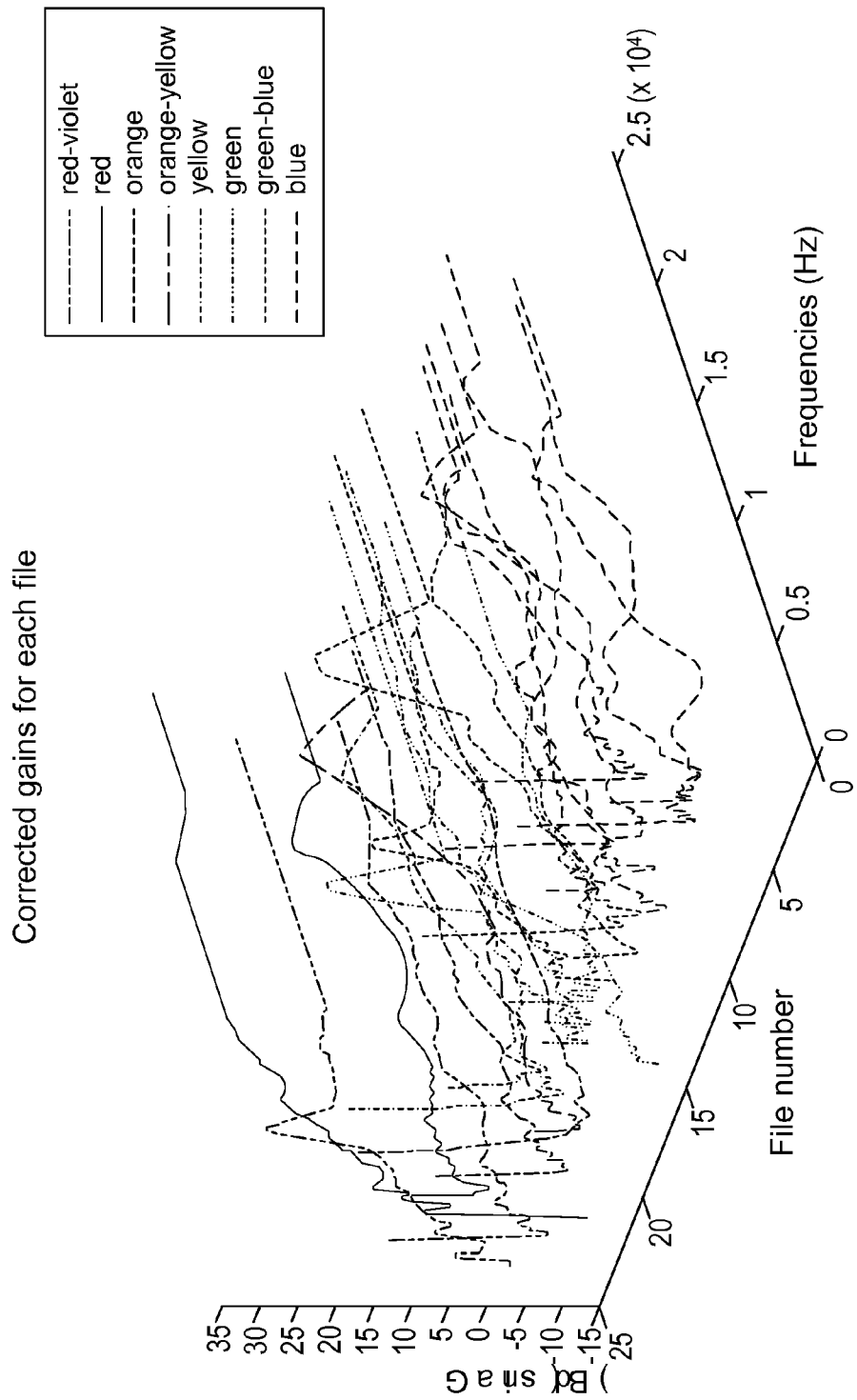
FIG. 7 illustrates a graph showing gains applied to "decolour" a spectra in an embodiment.

To be able to process the entire event, each audio track is subdivided in digital audio "atoms" (i.e., blocks, segments, portions, divisions, partitions) of, for example, greater than one second, about five seconds or less than ten seconds, as shown at step 60. Because the tracks do not necessarily start at the beginning of an atom, the first and last atom of the audio track may be typically "partial". As a result, an "arrangement matrix" A of size $J \times N_{atoms}$ is defined. Each element (j,n) of this matrix is equal to 1 if the file j is active during atom n, 0 otherwise. For partial atoms, A[j,n] is equal to the ratio between the number of samples in the atom and the size of an atom as shown in FIG. 6.

A size of an atom is chosen more precisely to be a multiple of the step of the spectrogram $N_{shift}$. This way each atom contains a whole number of frames. Contrary to the description of the original Gabor transform 6.2, which may fix $N_{shift}(a)$ instead of q, so that $N_{window} = kN_{shift}$.

Therefore, an atom is the smallest unit of time. For example, when estimating the intended audio signal (i.e., music) and the interferences, the processing is applied separately to each atom in time, over all available files at this point. During track selection, the linear programming problem also processes 5-second atoms.

Once the spectrogram of each audio file or track j has been computed as shown at step 58, a set of coefficients $c^j_{n,m}$ is generated, calculated or obtained. Next, the audio files or tracks may be are equalized, so that the transition between audio files or tracks becomes much less audible via a first processing technique (hereinafter "Processing Technique 1") which is implemented by the system 10 and the method 50 as shown at step 64. Second, third and/or fourth processing techniques may also be implemented as equalization for suppressing interferences which is further discussed hereafter.

The audio files or tracks may be "decolored" to obtain smooth transitions between the files or tracks. The transition from one track to another track is to be as seamless as possible. Therefore, it is best if the spectral content of the two files is approximately the same. To obtain this, the audio signals or tracks are equalized relatively to the other audio tracks available at the same time. However, in the case of an entire event (i.e., whole concert), the audio files or tracks do not span over the same regions in time.

An average spectrum $X_{avg}[n,m]_{dB}$ is computed for each atom n, using only the average spectra $X_{avg,j}$ of the "full atoms" at this time $F_n = \{j | A_{j,n} = 1\}$. Only the frequencies below cut-off are considered in the estimation using the masks $U_j(16)$. A "confidence" Cn on the estimation is given by the number of files we use to estimate the spectrum for atom n as set forth in equations (22) and (23):

$$X_{avg}[n,m]_{dB} = 10\log_{10}\left(\frac{1}{\sum_{j \in F_n} U_j[m]} \sum_{j \in F_n} U_j[m] X_{avg,j}[n,m]^2\right) \qquad (22)$$

$$C_n = |F_n| \qquad (23)$$

The average spectrum for each file j, at each atom n in time is computed from all the frames l in this atom in according with equation (24):

$$X_{avg,j}[n,m]^2 = \frac{1}{L_{atom}} \sum_l X_j[l,m]^2 \; l \in \{\text{frames in atom } n\} \qquad (24)$$

Once an average spectrum for each atom in time is calculated or obtained, the average spectrum is utilized by the method 50 to equalize the audio files or tracks and force the audio files or tracks to have the same average spectrum as shown at step 66. However, because the audio files or tracks span over different lengths, corrections for an audio file or track as a weighted mean of the correction in each atom, using the confidence $C_n$ is computed. Because the file or track being processed is obviously among the files or tracks that were used to compute the average spectrum, $\{C_n-1\}$ is utilized as weights, and not $\{C_n\}$. The weighted mean $Gj[\bullet]_{dB}$ is computed in decibels, from the differences for each atom $G_j[n,\bullet]_{dB}$ according to equations (25) and (26):

$$G_j[n,m]_{dB} = X_{avg}[n,m]_{dB} - X_{avg,j}[n,m]_{dB} \qquad (25)$$

$$G_j[m]_{dB} = \frac{1}{\sum_n (C_n - 1)} \sum_n (C_n - 1) G_j[n,m]_{dB} \qquad (26)$$

$$n \in \{n \mid A_{j,n} = 1\}, m \in 0 \ldots \mu_{cut-off,j}$$

If there is no overlapping file for the current file j, i.e. $C_n$32 1 $\forall n \in \{n | A_{j,n}=1\}$, then the current file cannot be processed and is left as is. Otherwise, the spectrogram of the file j is corrected using the gains $G_j$. The gains are previously smoothed along frequencies and are then applied to all the frames 1 of the spectrogram of the audio file or track according to equation (27):

$$X_j[l,m]_{dB} \leftarrow X_j[l,m]_{dB} + G_j[m]_{dB} \qquad (27)$$

It may be noted that for a given file or track, the filtering does not vary in time. Therefore, any noise from the recording may not be removed from the file or track. Only the "colour" (spectrum) of the files all together may be normalized.

When estimating spectra and spectrograms, the spectra and spectrograms may need to be smoothed in both time and frequency, to avoid applying extreme gains to the signals or track. For frequency smoothing, a Moving Average filter is used on the frequency bins.

However, adjusting or accounting for the fact that audio signals (i.e., music signals) make more sense in the log-frequency domain, the size of the MA filter changes according to frequency. A constant smoothing size log ($\beta$) in log-frequencies may be kept constant, which is equivalent to a constant ratio $\beta$ for frequencies. When filtering the frequency $f_0$, all frequency bins between $1/\sqrt{\beta}f_0$ and $\sqrt{\beta}f_0$ are taken into account. The ratio $\beta$ may be chosen as the ratio of two specific frequencies, or to give it a musical/physical sense, as a number of semitones s (there are 12 semitones in an octave): $\beta = 2 \; s/12$. The weights of the filter of each frequency are normalized to sum to one, and all the frequencies above the cut-off frequency are ignored in accordance with equation (28):

$$H_{freq\text{-}smooth}[m, m'] = \begin{cases} \frac{1}{|\mathcal{H}_{m'}|} & \text{if } m \in \mathcal{H}_{m'} \text{ and } m' \le \mu_{cut\text{-}off} \\ 0 & \text{otherwise} \end{cases} \quad (28)$$

where $\mathcal{H}_{m'} = \{m | \beta^{-1/2} \, f(m') \le f(m) \le \min(f_{cut\text{-}off}, \beta^{1/2} f(m'))\}$ and f(m) is the frequency (in Hertz) corresponding to bin m.

Figure 8:
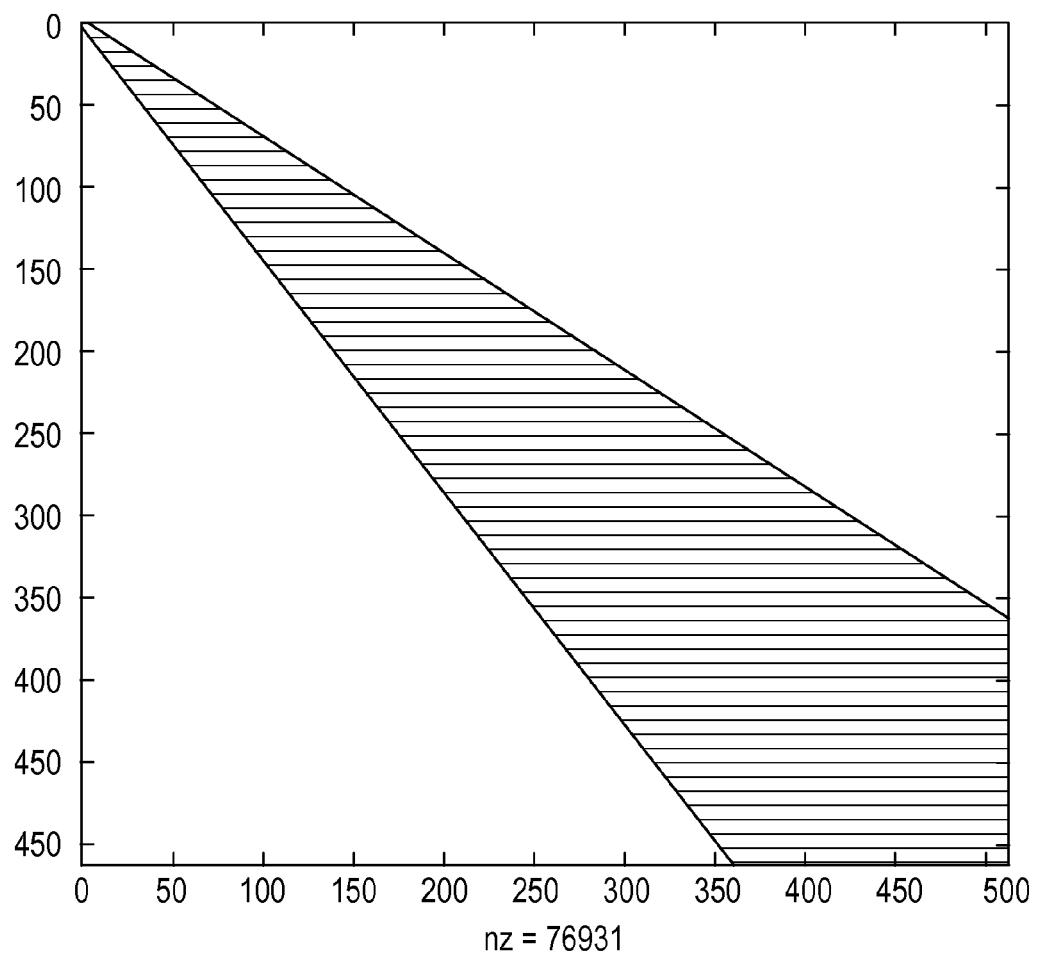
FIG. 8 illustrates a graph showing non-zero elements of the smoothing matrix for $\beta=2$ (s=12) in an embodiment.
Figure 9:
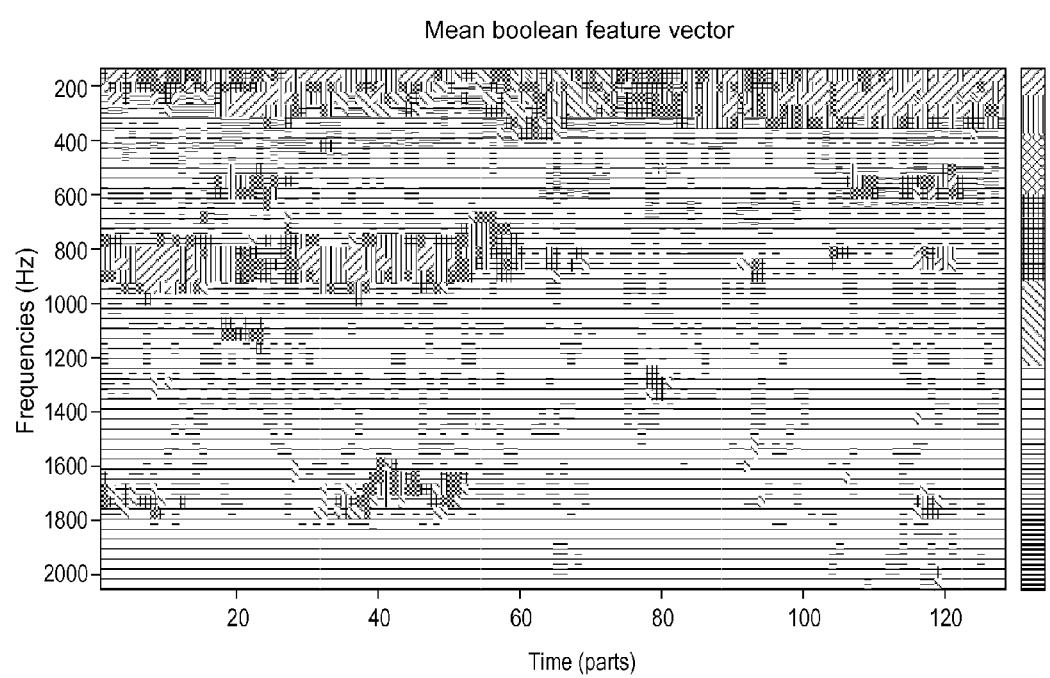
FIG. 9 illustrates a graph showing a mean binary vector B[l,m] in an embodiment.

Smoothing the spectrogram in frequencies therefore becomes a simple multiplication by a smoothing matrix: $X \leftarrow X \times H_{freq\text{-}smooth}$. FIG. 8 shows the shape (non-zero elements) of the smoothing matrix for $\beta=2$ (s=12) and more frequency bins are used for smoothing as high frequencies are approached.

If a spectrogram is processed and not just a spectrum, time smoothing may be performed. It is computed using finite differences, as an Auto Regressive filter of first order according to equation (29):

$$X_{music}[n,m]_{dB} \leftarrow (1-\alpha)X_{music}[n, m]_{dB} + \alpha X_{music}[n-1, m]_{dB} \quad (29)$$

$\alpha$ is linked to the time constant $\tau_{smoothing}$ of the filter by:

$$\alpha = e^{a = e^{-\frac{a}{\tau_{smoothing}}}}.$$

$\alpha$ is the time (in seconds) between two frames, defined in the Gabor transform.

An interference detection mechanism based on feature vectors may be utilized by the system 10 and/or method 50. The system 10 and method 50 may utilize a more complex algorithm for interferences removal which will be discussed hereinafter. Because the file or tracks are extremely noisy and/or distorted files or tracks, a complete "Common Signal Extraction" scheme may sometimes give inaccurate results. However this simple interference detection method seems to be much more robust to noise and still provides valuable information. Without removing interferences, the files or tracks in which no interference was detected can simply be chosen or selected.

Binary feature vectors may be utilized by the system 10 and method 50 to obtain a low-dimensional (compared to the original time signal) representation of an audio signal or track. A binary vector is closely related to the spectrogram of the signal or track which was previously computed (see Shumeet Baluja and Michele Covell, "Waveprint: Efficient wavelet-based audio fingerprinting," Pattern Recognition, 41(11):3467-3480, November 2008). All the signals or tracks to be compared have been equalized. From the spectrogram $X_j$ of each file or track j, a sparse boolean matrix $B_j$ where the non-zero elements are the spectrogram's coefficients with the highest amplitude is obtained or calculated. This new matrix is limited to the frequency range $f \in [150, 2000]$ Hz of the original spectrogram. The sparseness of the boolean vector is a parameter of the algorithm and is s=0.8 in according with equation (30):

$$B_j[l, m] = \begin{cases} 1 & \text{if } \frac{\sum_{\lambda,\mu} 1(X_j[l, m] \ge X_j[\lambda, \mu])}{LM} \ge s \\ 0 & \text{otherwise} \end{cases} \quad (30)$$

where L is the number of frames in the spectrogram and M the number of frequency bins.

From the binary vectors, audio events that are unique to one of the files or tracks (the interferences) are identified as shown in FIG. 68. To do this, the average feature vector $$\overline{B}[l, m] = \frac{1}{J}\sum_{j=1}^{J} B_j[l, m]$$

is computed. All the values that are set to one in a binary vector and that are present in less than a given percentage $B_{int}=50\%$ of all files are considered as interferences. This creates a new binary mask I defining the interferences for file or track j in accordance with equation (31):

$$I_j[l,m] = \mathbb{1}_{(B_j[l,m]=1)} \mathbb{1}_{(\overline{B}[l,m]<B_{int})} \quad (31)$$

Note that when J=2, no interference can be found if $B_{int}$ is set to 0.5, because, if there are only two files or tracks, it cannot be sure of which file or track contains interferences and which file or track is the clean audio.

From the mask I, the power of the interference compared to the whole signal is computed or calculated. The Interference-to-Signal Ratio over time is according to equation (32):

$$ISR_j[l] = \frac{\sum_m I_j[l, m]((1 - \overline{B}[l, m] + 1/J)^2 X_j[l, m])^2}{\sum_m X_j^2[l, m]} \quad (32)$$

The contribution of each "interference bin" is weighted by its number of occurrences in other files or tracks. This way, if the interference is unique to the file or track, full power of the interference is counted in the ISR:

$$(1 - 1/J + 1/J)^2 = 1.$$

However, interferences that are also found in some other files or tracks have less weight in the ratio. It can be noted that interferences are a subset of the spectrum of the signal or track, therefore $0 < ISR_j[l] < 1$. Because the binary vectors are noisy, the ISR may almost never 0 when it should be. To avoid too many false positives, the ratio is thresholded and then averaged to produce a global indicator according to equation (33):

$$\overline{ISR}_j = \frac{1}{L}\sum_l \min\left(1, \max\left(0, \frac{ISR_j[l] - ISR_{min}}{ISR_{max} - ISR_{min}}\right)\right) \quad (33)$$

where $ISR_{min}=0.4$ and $ISR_{max}=0.8$. $\overline{ISR}_j$ is then used during the optimization by the cost function.

The interference detection algorithm executable by the system 10 and method 50 provides convincing and synergistic results. In an embodiment, the interference detection algorithm may utilize a binary vector that is created using a fixed sparseness, that if a spectrogram contains interferences that are louder than the desired audio signal (i.e., music), some binary bins of the desired audio signal (i.e., music) may not be present in the boolean vector.

In embodiments, the system 10 and method 50 extract one or more common signals from the audio files or tracks and remove one or more interferences from the audio files or tracks as shown at step 70. The fourth technique (hereinafter "Processing Technique 4") may remove interferences (i.e., un-desirable sources), and may then globally equalize the files or tracks. The interference removal processing is performed independently on each atom, to handle the appearance of new recordings during the concert. The interferences in each file or track are removed and the "cleaned" spectrograms are saved. The global equalization is then performed, in a process that is the same or substantially the same as the process for Processing Technique 1, on the "cleaned" spectrograms.

The system 10 and method 50 may execute a Common Signal Extraction (CSE) algorithm to obtain a decomposition of each observation (file) j according to equation (34):

$$X_j = (X_c + X_{int,j})\text{diag}(g_j) \quad (34)$$

Figure 11B:
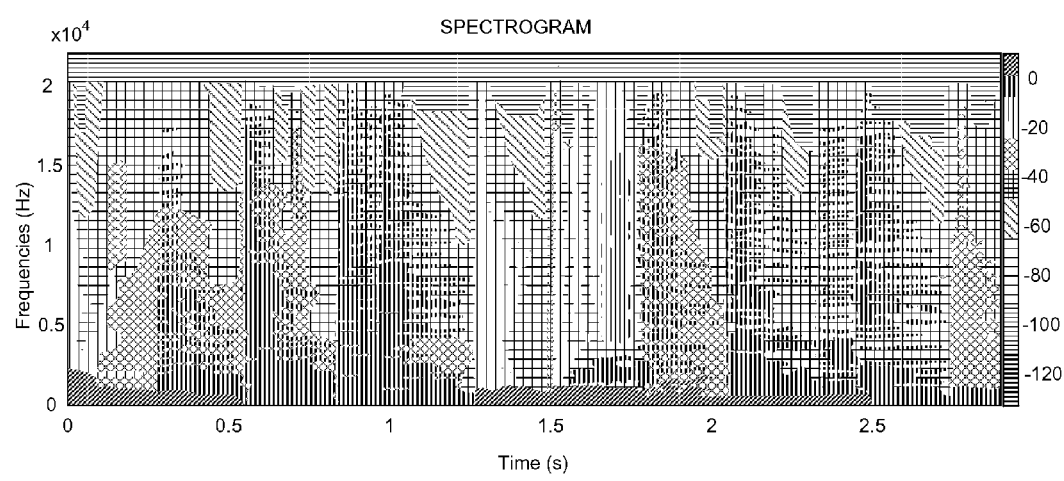
Figure 12A:
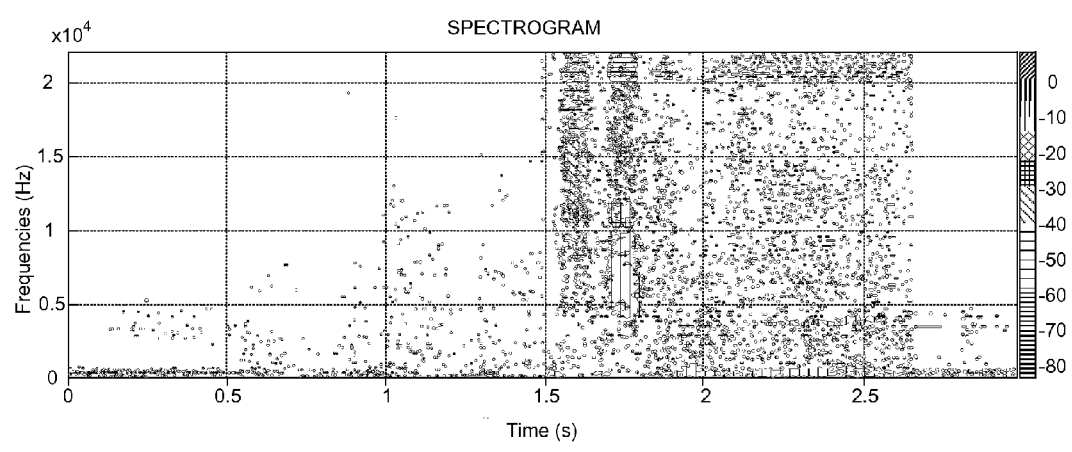
Figure 15:
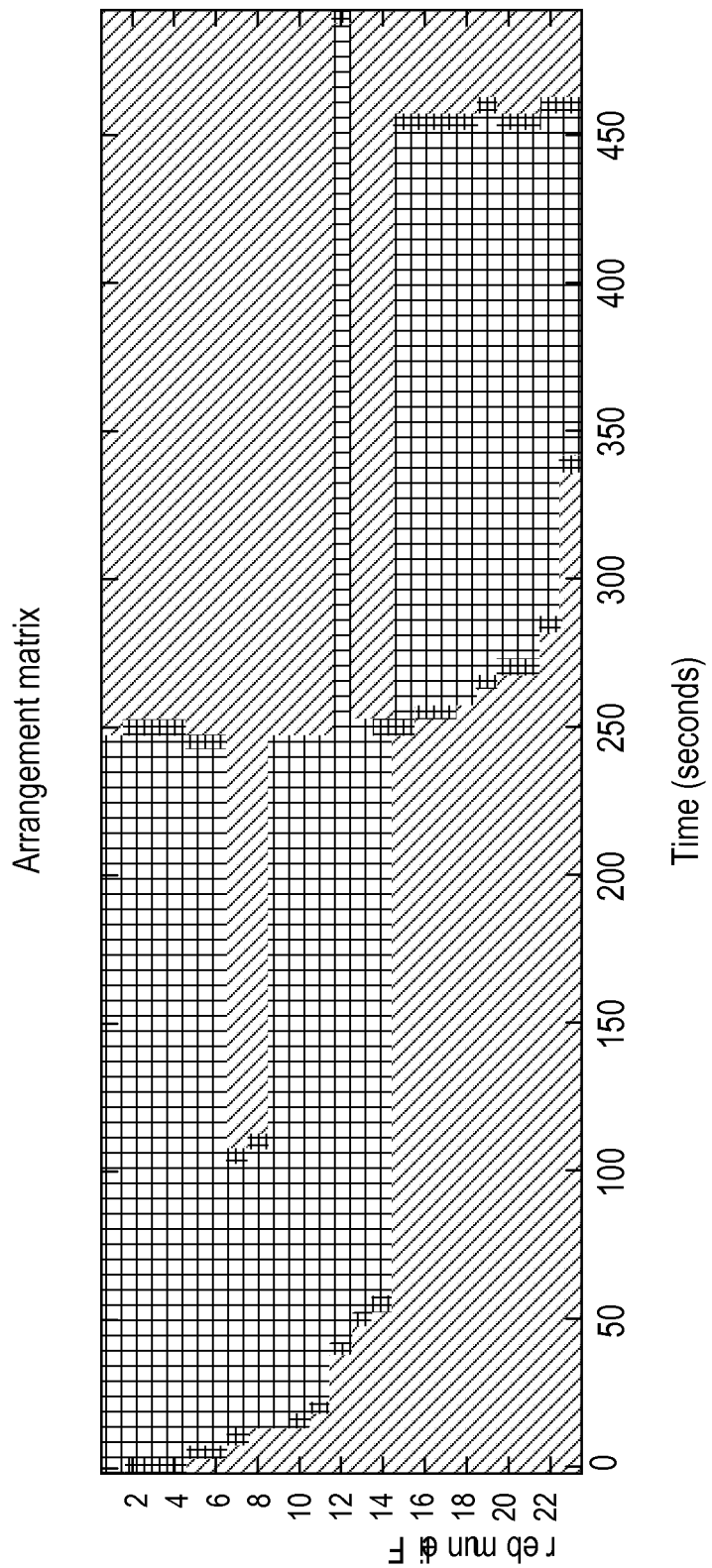
FIG. 15 illustrates an arrangement matrix A for 2 songs, each comprising 23 files, in an embodiment.
Figure 17:
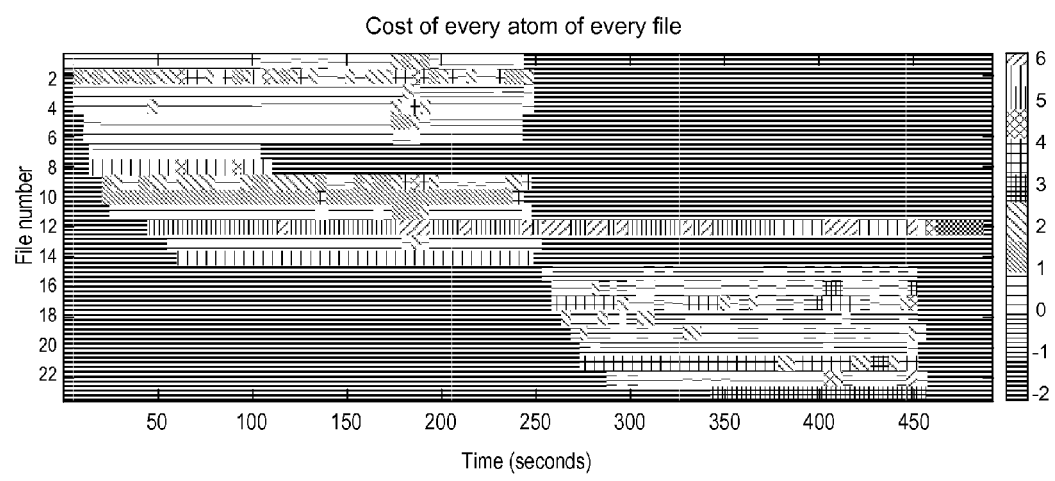
FIG. 17 illustrates a graph showing costs J[j, n] for all the files in an embodiment.

$g_j$ is a filter specific to each recording. $X_c$ is the spectrogram of the common signal (i.e., the music). $X_{int,j}$ is the spectrogram describing the interferences, and is specific to each file j. To obtain this decomposition, an iterative algorithm is executed or completed by the system 10 and/or method 50 (see Emmanuel J. Candès, Xiaodong Li, Yi Ma, and John Wright, "Robust Principal Component Analysis?," Journal of the ACM, 58(3):1-37, May 2011). However, the assumption that $X_{int,j}$ is sparse (the interferences are localised in time and/or frequency) when made. Ideally, $g_j$ may be a realistic filter that may not vary too abruptly. An example of results is shown in FIGS. 11-13.

The CSE algorithm is the following:
Input: $N_{sensors}$ observations $X_j$, common ratio ρ, maximum number of iterations $k_{max}$, initial magnitude threshold τ, initial smoothing ratio s, minimum magnitude threshold τ, (optional) initial scaling ratio r
1. Initialize the algorithm:

$$k = 1$$
$$\beta = 2^{\frac{s}{12}}$$
$$X_{c,j}^{filt} = X_j \;\forall\; j$$
$$X_{int,j}^{filt} = 0 \;\forall\; j$$

$$g_j[m] = \sqrt{\frac{1}{N_{sensors}} \frac{\sum_{i,n} X_{c,i}^{filt}[n,m]^2}{\sum_n X_{c,j}^{filt}[n,m]^2}} \;\forall\; j, m$$

$$g_j \leftarrow g_j H_{freq\text{-}smooth}^{\beta}$$

2. While $k \leq k_{max}$ and max $$\left(\frac{\|X_j - (X_j^{SVD} + X_{int,j})\text{diag}(g_j)\|_{\mathcal{F}}^2}{\|X_j\|^2}\right) > \epsilon:$$

(a) "Unfilter" the estimated common part, and the original spectrogram, for each observation j:

$$X_{c,j} = X_{c,j}^{filt}\text{diag}(g_j)^{-1} \forall j \quad (35)$$

$$X_j^{unfilt} = X_j \text{diag}(g_j)^{-1} \quad (36)$$

(b) Update the new common part from the old, unfiltered, common spectrograms $X_{c,j}$, using the rank one approximation:

i. Compute the SVD decomposition of the spectrograms, gathered as columns of a same matrix:

$$USV^T = [x_{c,1} \ldots x_{c,N_{sensors}}] \quad (37)$$

ii. Keep only the largest singular value, and reconstruct the estimated common part (which is the same for all observation, up to a constant factor):

$$[x_1^{SVD} \ldots x_{N_{sensors}}^{SVD}] \leftarrow U\,\text{diag}([s_{1,1} 0_{1,N_{sensors}-1}])V^T = \quad (38)$$
$$s_{1,1}[v_{1,1}u_{.,1} \ldots v_{N_{sensors},1}u_{.,1}]$$

(c) Update the differences between each observation and the common part estimated by the SVD. Then threshold (T) them (element-wise):

$$X_{int,j} = T(X_j^{unfilt} - X_j^{SVD}, \tau) \quad (39)$$

$$T(x) = \begin{cases} x & \text{if } |x| \geq \tau \\ 0 & \text{otherwise} \end{cases} \quad (40)$$

(d) (Optional) Lower the contribution of negative values in the interferences (because spectrograms should be non-negative):

$$X_{int,j}[n,m] \leftarrow \begin{cases} X_{int,j}[n,m] & \text{if } X_{int,j}[n,m] \geq 0 \\ \dfrac{X_{int,j}[n,m]}{r} & \text{otherwise} \end{cases} \quad (41)$$

(e) Update the estimated common part, only by removing the interferences:

$$X_{int,j}^{filt} = X_{int,j}\text{diag}(g_j) \quad (42)$$

$$X_{c,j}^{filt} \leftarrow X_j - X_{int,j}^{filt} \quad (43)$$

(f) Update the gains using the approximate common part, and smooth the gains in frequency using the current smoothing ratio:

$$g_j[m] = \sqrt{\frac{1}{N_{sensors}} \frac{\sum_{i,n} X_{c,i}^{filt}[n,m]^2}{\sum_n X_{c,j}[n,m]^2}} \;\forall\; j, m \quad (44)$$

$$g_j \leftarrow g_j H_{freq\text{-}smooth}^{\beta} \quad (45)$$

(g) Update the interference magnitude threshold and the smoothing factor:

$$\tau \leftarrow \max(\rho\tau, \tau_{min}) \; s \leftarrow \rho s \; \beta \leftarrow 2^{\frac{s}{12}} \; r \leftarrow \max(\rho r, 1) \; k \leftarrow k+1$$

3. Return $X_{c,j}^{filt}$ and $X_{int,j}^{filt}$ for all j.

In embodiments, the system 10 and method 50 may apply CSE algorithm to each 5-second atom independently. For a single atom, not all files or tracks may be used for processing. Only the signals with a cut-off frequency higher than, for example, 14 kHz may be used. The spectrograms, given to the CSE algorithm, are cropped between f∈[80, 1400] Hz. Using the detected interferences, the spectrograms are then corrected using a modified Wiener filtering according to equation (46):

$$X_j[n, m] \leftarrow \max\left(0, 1 - g_{Wiener} \frac{X_{int,j}^{filt}[n, m]}{X_j[n, m]}\right) \times X_j[n, m] \quad (46)$$

For $g_{Wiener} > 1$, this attenuates the detected interferences more than a regular Wiener filter would. As a result, the method 50 removes interferences from the audio tracks as shown at step 72. Choosing $1 < g_{Wiener} \leq 2$ may improve the results (subjectively, but also in terms of SDR).

In embodiments, the system 10 and method 50 may execute linear programming for optimum track selection to generate the single output track 32 as shown at step 74. During spectrogram analysis, the phase of the original file or track is utilized to reconstruct the signal in the time domain. As a result, as many outputs as inputs are always obtained and only one of output is selected to create the single output track 32 of the event. This can be formulated as the following optimization problem: always choose the best track, without "jumping" between files too often. Indeed, although the tracks are supposed to have been processed, differences between them still exist and switching from one track to another is audible to a listener.

Because solving such a problem is time consuming, the system 10 and method 50 simplify solving the problem in two ways:
- The granularity of the problem is reduced from a frame step ($N_{shift}$) to $T_{atom}=5$ s. The reason for this is twofold: switching between files or tracks too often is not desirable, and the quality of each file does not change dramatically over 5 seconds.
- The problem is solved locally, instead of solving it for the whole concert. This is because it may be safely assume that choosing the best track at one point in time does not influence a subsequent choice of a track a few minutes later.

A cost is therefore computed for each file j, at each atom n in time: $\Im[j,n]$. This cost may depend on several factors, such as, for example, cut-off frequency, compression, clipping and/or the like. The simplest way to solve the problem would be to choose the minimum cost for each atom in time, but it would not satisfy the "stability constraint" that limits the number of "jumps" between files. Thus, the system 10 and method 50 performs or executes linear programming to solve the problem.

The costs $\Im[j,n]$ may be computed before the actual optimization, using the analysis and processing that were applied to the files or tracks, such as, for example, clipping detection, spectrogram analysis and/or the like. These costs will not change during the optimization, and will simply be coefficients in the linear objective function f.

Clipped samples are undesirable artefacts in the signal or track. To include this in the cost function, the ratio of clipped samples in the atom n for file j is utilized and computed according to equation (5). To obtain a normalized value, define a minimum $\rho$–clipping=0.0001 and maximum $\rho^+$ clipping=0.001 value for the ratio according to equation (47):

$$\Im_{clipping}[j, n] = \max\left(0, \min\left(1, \frac{\rho_{clipping}[j, n] - \rho_{clipping}^-}{\rho_{clipping}^+ - \rho_{clipping}^-}\right)\right) \quad (47)$$

The cut-off frequency is a first clue on the estimation of the compression and the overall quality of the signal or track. Therefore, the higher the cut-off frequency is, the better. It is estimated using equation (15). The cost must be higher when the cut-off frequency is small. Therefore, by defining two extrema, the cost may be expressed according to equation (48):

$$\Im_{cut-off}[j] = 1 - \max\left(0, \min\left(1, \frac{f_{cut-off,j} - f_{cut-off}^-}{f_{cut-off}^+ - f_{cut-off}^-}\right)\right) \quad (48)$$

where $f_{cut-off}^-=4$ kHz and $f_{cut-off}^+=20$ kHz. It may be noted that this cost does not vary with time n, only with the file or track j.

An "interference cost" is assigned to each atom, using the processing for interference detection with binary feature vectors. The mean Interference-to-Signal Ratio is thresholded to obtain equation (49):

$$\Im_{interference}[j, n] = \max\left(0, \min\left(1, \frac{\overline{ISR}_j[n] - \overline{ISR}^-}{\overline{ISR}^+ - \overline{ISR}^-}\right)\right) \quad (49)$$

In embodiments, the system 10 and method 50 may estimate of the compression of the file or track, such as, for example, MP3, AAC or the like. Using the data compression estimator set forth in equation (18), a cost may be added to files that are badly or poorly encoded. The normalization is the same as the other costs and in accordance with equation (50):

$$\Im_{compression}[j, n] = \max\left(0, \min\left(1, \frac{\overline{Z}[j, n] - \overline{Z}^-}{\overline{Z}^+ - \overline{Z}^-}\right)\right) \quad (50)$$

where $\overline{Z}[j,n]$ is the estimated compression for atom n of file j. $\overline{Z}^-=15\%$ and $\overline{Z}^+=40\%$.

In embodiments, the system 10 and method 50 may detect distortion using $\mathcal{D}$ according to equation (21). False positives may appear in some signals or tracks (usually the signals or tracks with high dynamic range). Therefore small values of $\mathcal{D}$ are thresholded, even if this means that some slightly distorted files will not be detected. Additionally, values over 0.5 correspond to highly distorted files. All distortion estimates are therefore clipped over this value according to equation:

$$\Im_{distortion}[j, n] = \max\left(0, \min\left(1, \frac{\overline{D}[j, n] - \overline{D}^-}{\overline{D}^+ - \overline{D}^-}\right)\right) \quad (51)$$

with $\mathcal{D}^-=0.04$ and $\mathcal{D}^+=0.5$.

A weight $\omega$ is assigned to each variable of the cost. The global $\Im$ is therefore:

$$\Im[j, n] = \omega_{cut-off}\Im_{cut-off}[j] + \quad (52)$$
$$\omega_{clipping}\Im_{clipping}[j, n] + \omega_{interference}\Im_{interference}[j, n] +$$
$$\omega_{compression}\Im_{compression}[j, n] + \omega_{distortion}\Im_{distortion}[j, n]$$

The cost function defined previously above is only defined for full atoms. Of course, choosing empty or partial atoms should be avoided as much as possible. However, when nothing else is available, the method 50 still has to make a decision. Because it is not possible to differentiate between empty atoms, empty atoms are assigned the same cost. The cost of partial atoms is proportional to the quantity of signal contained therein. The maximum cost among full atoms $\mathcal{F}$ is defined according to equations (53) and (54):

$$\mathfrak{J}_{max} = \max_{(j,n)\in\mathcal{F}} \mathfrak{J}[j,n] \quad \mathcal{F} = \{(j,n) \mid A_{j,n} = 1\} \tag{53}$$

$$\mathfrak{J}[j,n] = \omega_{not\,full} \times \mathfrak{J}_{max} \times (2 - A_{j,n}) \quad \forall A(j,n) \in \mathcal{F}^c \tag{54}$$

where A is the arrangement matrix and $\omega_{not\,full}$ is a multiplicative factor to ensure that partial atoms are chosen only if necessary.

In embodiment, the system 10 and method 50 may perform optimization on one or more portions of the entire event as shown at step 76. The system 10 and method 50 solve the optimization problem locally so that the complexity of the problem does not explode or become overwhelming. First, the method 50 splits the entire event, such as, for example, a concert in equal parts having a predetermined time duration. For example, the duration of the equal parts (i.e., the optimization windows) may be, greater than one minute, about five minutes or less than ten minutes. Therefore, the windows may be chosen using a simple but effective algorithm executable by the method 50 that ensures that windows boundaries are placed in "stable regions," where no file or track starts or ends. This typically happens in the middle of, for example, a musical song.

To determine the best or most desirable times to split the optimization, the method 50 determines how many files start and end at each atom n:

$$\tilde{F}[n] = \sum_j |\lfloor A_{j,n} \rfloor - \lfloor A_{j,n-1} \rfloor| \tag{55}$$

The signal $\tilde{s}[n]$ is then smoothed in time to find the atoms that are the furthest from new/ending files or tracks. The "penalty" P[n] of choosing an optimization window boundary close to starting/ending files or tracks must be higher:

$$P[n] = \omega_{penalty} * \tilde{s}[n] \tag{56}$$

where $w_{penalty}[n]$ is a triangular window. For example, the length may be about 3 minutes (converted in "atom length"). The window boundaries are then deduced from P[n]. For example, each window must be larger than 1 minute or 2.5 minutes and smaller than 5 or 10 minutes. These values were chosen because they usually correspond to the length of, for example, a musical song. Moreover, the window may be limited to, for example, 5 minutes, to avoid overloading the linear programming solver.

The windows are determined chronologically:
1. Set $n_{start}=0$, $N_{windows}=-1$, $n_{end}$ an empty list/vector
2. While $N_{windows}=-1 \lor n_{end}[N_{windows}]<N_{atoms}-1$
    (a) If $N_{atoms}-n_{start}<$LastWindowMinSize
        i. Too few atoms left to create a new window, append them to the last one:

$n_{end}[N\text{ windows}]=N_{atoms}-1$ ii. Leave the loop
    (b) Else if $N_{atoms}-n_{start}<$WindowMinSize
        i. The end of the concert is reached, but there are still enough atoms to create a new window:

$N_{windows}\leftarrow N_{windows}+1, n_{end}[N_{windows}]=N_{atoms}-1$ ii. Leave the loop
    (c) Otherwise, find the most appropriate atom to split the optimization:
        i. $N_{windows}\leftarrow N_{windows}+1$
        ii. $n_{end}[N_{windows}]=\arg\min_n P[\mu n]$. If several minima exist, then the first one is kept. Then search is restricted to possible window lengths:

$n\in[n_{start}+\text{WindowMinSize}-1, \min(N_{atoms},n_{start}+\text{WindowMaxSize}-1)]$ iii. $n_{start}=n_{end}[N_{windows}]+1$ All lengths are expressed in "atoms". For example, WindowMinSize=2.5 min, WindowMinSize=5 min, LastWindowMinSize=1 min. The output of the algorithm is the vector $n_{end}$, containing the index of the last atom of each window.

In embodiments, the system 10 and method 50 may complete and/or solve a linear programming problem. In an embodiment, expressions of matrices of the linear programming problem as set forth in FIG. 14. One linear programming problem may be formulated as: Minimize the cost function at each atom in time such that A jump does not occur less than Nstable atoms after another jump.

The result of the algorithm executed by the method 50 is an index of the chosen file at each atom. This can be expressed as a linear programming problem according to equation (57):

$$\min_x(f^T x) \text{ such that } \begin{cases} Ax \leq b \\ A_{eq}x = b_{eq} \end{cases} \tag{57}$$

Here there is an additional constraint, which is that x must be a vector of binary values: $X \in \{0,1\}^d$. x therefore contains a series of zeros and ones that describe which file j is chosen at each atom n in time:

$$x^T=[x_{1,1} \ldots x_{J,1} \ldots x_{1,n} \ldots x_{J,n} \ldots x_{1,N_{atoms}} \ldots x_{J,N_{atoms}}]$$

where $x_{j,n}=1$ if j is the chosen file at atom n, 0 otherwise. The objective function is defined accordingly using the costs:

$$f^T=\mathfrak{J}[1,1] \ldots \mathfrak{J}[J,1] \ldots \mathfrak{J}[1,N_{atoms}] \ldots \mathfrak{J}[J,N_{atoms}]$$

A first constraint is to have strictly one file chosen at each point in time:

$$\sum_{j=1}^J x_{j,n} = 1 \quad \forall n$$

which, transcribed to matrix form gives:

$$A_{eq}x = b_{eq} \Leftrightarrow \begin{bmatrix} \overbrace{1 \ldots 1}^J & 0 & 0 & 0 \\ 0 & \overbrace{1 \ldots 1}^J & 0 & 0 \\ 0 & 0 & \ddots & 0 \\ 0 & 0 & 0 & \overbrace{1 \ldots 1}^J \end{bmatrix} x = \left.\begin{bmatrix} 1 \\ \vdots \\ 1 \end{bmatrix}\right\}N_{atoms}$$

Solving the linear programming problem is equivalent to choosing the lowest cost at each point in time, with no further constraints.

The linear programming problem may be improved to include, for example, the constraints on the "jumps". The jumps in the choices, using the vector x, are detectable by the method 50. By filtering the signal over time, it can be determined that $x_{j,n+1} - x_{j,n} = \pm 1$ if there is a jump at time n, 0 otherwise. As a result, a "slack variable" is defined by inequalities for $n \in [1, N_{atom}-1]$:

$$e_{j,n} \geq x_{j,n} - x_{j,n+1} \tag{58}$$

Because the slack variables are also binary $e_{j,n}$ is equal to 1 if the file j becomes inactive between atoms n and n+1, 0 otherwise. It may be noted that $e_{j,n}$ could also be equal to 1 when $x_{j,n} - x_{j,n+1} = 0$. However, because of minimizing the variables $e_{j,n}$, the variables may take the lowest value possible. Moreover, when j becomes active $x_{j,n} - x_{j,n+1} = 0$, and therefore $e_{j,n} = 0$ when it is minimized.

Without considering a minimum spacing between two jumps, the total number of jumps may be minimized according to equation (59):

$$\min_x \sum_{j,n} e_{j,n} \tag{59}$$

The slack variables are added to the objective function. The new vectors x and f become:

$$x^T = [x_{1,1} \ldots x_{J,N_{atoms}} \; e_{1,1} \ldots e_{J,N_{atoms}} - 1]$$

$$f^T = [\mathfrak{J}[1,1] \ldots \mathfrak{J}[J,N_{atoms}] \mathfrak{J}_{jump} \ldots \mathfrak{J}_{jump}]$$

$\mathfrak{J}_{jump}$ is the cost of half a jump. Of course, $\mathfrak{J}_{jump}$ has to be chosen carefully. If it is too large, it will completely refrain the algorithm to jump from one file to another. If it is too small, the constraint will not matter and the trivial problem previously described above returns. To obtain a cost that scales properly with the number of atoms in the optimization, the cost of a jump is defined by equation (60):

$$\mathfrak{J}_{jump} = \mathfrak{J}_{jump} \times N_{atoms} \tag{60}$$

where $\mathfrak{J}_{jump}$ is the real cost of a jump.

The two matrices A and b are definable to express the two conditions on each slack variable (58): $\pm(x_{j,n} - x_{j,n+1}) - e_{j,n} \leq 0$. For example, for the first slack variable $e_{1,1}$:

$$\left[ 1 \; \overbrace{0 \ldots 0}^{J-1} \; -1 \; \overbrace{0 \ldots 0}^{J-1} \; \overbrace{0 \ldots 0}^{(N_{atoms}-2)J} \; -1 \; \overbrace{0 \ldots 0}^{J-1} \; \overbrace{0 \ldots 0}^{(N_{atoms}-2)J} \right] x \leq 0$$

A is composed of the two conditions for each slack variable and is therefore $2J(N_{atoms}-1) \times J(2N_{atoms}-1)$ and b is simply a column vector of $J(N_{atoms}-1)$ zeros.

$$A = \begin{bmatrix} 1 & 0 & \overbrace{0 \ldots 0}^{J-2} & -1 & 0 & \overbrace{0 \ldots 0}^{J-2} & \overbrace{0 \ldots 0}^{(N_{atoms}-2)J} & -1 & 0 & \overbrace{0 \ldots 0}^{J-2} & \overbrace{0 \ldots 0}^{(N_{atoms}-2)J} \\ 1 & 0 & 0 \ldots 0 & 0 & -1 & 0 \ldots 0 & 0 \ldots 0 & 0 & -1 & 0 \ldots 0 & 0 \ldots 0 \\ \vdots & & \vdots & & & \vdots & \vdots & & & \vdots & \vdots \\ \underbrace{\hspace{8em}}_{JN_{atoms}\text{corresponding to } x_{j,n}} & & & & & & \underbrace{\hspace{8em}}_{J(N_{atoms}-1)\text{,corresponding to } e_{j,n}} & \end{bmatrix} \Big\} J(N_{atoms}-1)$$

The previous definition may minimize the total number of jumps, based on the penalty affected to a jump $\mathfrak{J}_{jump}$. This has two drawbacks. The first drawback is the correct value for $\mathfrak{J}_{jump}$ needs to be experimentally found, which results in an appropriate number of jumps. The second drawback is that this formulation allows two adjacent jumps to happen, if it minimizes the global objective function. This may not desirable because a switch between two files or tracks is audible to a listener.

To overcome these difficulties, a new linear programming problem is formed or solved that forces the jumps to be spaced by at least $N_{stable}$. $\mathfrak{J}_{jump}$ is set to an extremely small value, just to ensure that the slack variables take the correct values (that they are 0 when there is no jump). However, the minimization now happens on a new set of slack variables. A sliding window of length $N_{stable}$ is definable, and force the optimization to find a solution that has a single jump within each position of the sliding window. For the window starting at atom $n \in [1, N_{atoms} - N_{stable}]$, the slack variable $e_n$ is equal to 1 if there is more than one jump in the window:

$$(N_{stable} - 1)\epsilon_n \geq \sum_i \sum_{a=n}^{n+N_{stable}-1} e_{j,a} - 1 \tag{61}$$

Using the slack variables $e_{j,n}$ defined previously, the sum over j and a is equal to twice the number of jumps in the window. $e_n$ has to be 1 only if the number of jumps in the window is greater than 1. To include these new variables, the output vector and objective function become:

$$x^T = [x_{1,1} \ldots x_{J,N_{atoms}} \; e_{1,1} \ldots e_{J,N_{atoms}} - 1 \; \epsilon_1 \ldots \epsilon_{N_{atoms}-N_{stable}}]$$

$$f^T = [\mathfrak{J}[1,1] \ldots \mathfrak{J}[J,N_{atoms}] \mathfrak{J}_{jump} \ldots \mathfrak{J}_{jump} \mathfrak{J}_{stable} \ldots \mathfrak{J}_{stable}]$$

jump is set to $10^{-8}$, just to ensure that the $e_{j,n}$ take the correct values. $\mathfrak{J}_{stable}$ is set to a very high value, because two jumps from occurring in the same window $N_{stable}$ should be avoided. The value is set using the maximum cost according to equation (62):

$$\mathfrak{J}_{stable} = \omega_{stable} \times \max_{(j,n)}(\mathfrak{J}[j,n]) \tag{62}$$

The conditions on the new slack variables may be rewritten as:

$$\sum_j \sum_{a=n}^{n+N_{stable}-1} e_{j,a} - (N_{stable}-1)e_n \leq 1 \tag{63}$$

Therefore, the conditions are expressed with two new matrices A' and b':

$$A' = \begin{bmatrix} 0_{1,JN_{atoms}} & 0.5 \times 1_{1,JN_{stable}} & 0_{J(N_{atoms}-1-N_{stable})} & \\ \vdots & & \ddots & -(N_{stable}-1) \times \mathbb{1}_{(N_{atoms}-N_{stable})} \\ 0_{1,JN_{atoms}} & 0_{J(N_{atoms}-1-N_{stable})} & 0.5 \times 1_{1,JN_{stable}} & \\ \underbrace{\phantom{0_{1,JN_{atoms}}}}_{x_{j,n}} & \underbrace{\phantom{0_{J(N_{atoms}-1-N_{stable})}}}_{e_{j,n}} & & \underbrace{\phantom{----------}}_{\epsilon_n} \end{bmatrix}$$

$$b' = 1_{N_{atoms}-N_{stable},1}$$

where $0_{i,j}$ is a i×j matrix of zeros, $1_{i,j}$ is a i×j matrix of ones, and $\mathbb{1}_i$ is a i×i identity matrix.

To make the optimization quicker previous choices may be forced and the entire event, such as, for example, an entire musical concert, may be divided in smaller windows or portions, that contain fewer atoms, by the method 50. To ensure that there are no discontinuities between the optimization windows, last choices of the previous window are forced at the beginning of the current one. To do this, these choices are added at the beginning of the vector x. $N_{stable}-1$ previous values are necessary to satisfy the stability constraint:

$$x^T = [x'_{1,1} \ldots x'_{J,N_{stable}-1} \; x_{1,1} \ldots x_{J,N_{atoms}} \; e_{1,1} \ldots e_{J,N_{atoms}-N_{stable}}] \quad (64)$$

$$f^T = [0_{1,J(N_{stable}-1)} \; \mathfrak{J}[1,1] \ldots \mathfrak{J}[J, N_{atoms}] \; \mathfrak{J}_{jump} \ldots \mathfrak{J}_{jump} \; \mathfrak{J}_{stable} \ldots \mathfrak{J}_{stable}] \quad (65)$$

In embodiments, the system 10 and method 50 merge selected audio files or tracks from the input tracks 30 together to generate, produce or create the single output track 32 as shown at step 78. To merge the selected files or tracks, the processed spectrogram of each atom is converted back to the time domain. When jumping from one file or track to another, a fade in/out can be applied if the file or track jumped from has an additional atom after the current one. The fade applied has a constant energy profile:

$$u_{in}[n] = \sqrt{\frac{n}{N_{fade}}} \quad n \in 0 \ldots N_{fade}-1 \quad (66)$$

$$u_{out}[n] = \sqrt{\frac{N_{fade}-n}{N_{fade}}} \quad n \in 0 \ldots N_{fade}-1 \quad (67)$$

where $N_{fade}=4$ s×$F_s$. The two signals to mix are multiplied by $u_{in}$ and $u_{out}$.

In embodiments, the system 10 and method 50 may normalizing and/or limiting the single output file or track 32 as shown at step 80. When merging the files or tracks together in, for example, MATLAB, the computations are performed using floating point precision. Even though the files or tracks were first normalized between ±1, the output may be outside of this range. Normalizing the signal or track again may avoid clipping. However, normalizing the signal lowers the volume of the recording or track.

Forcing a specific RMS level in the output file ensures that the difference between the content of the tracks (i.e., music during concert) and other sources (i.e., advertisement or other videos a viewer may be watching) is not too large or disproportional. Adjusting the level of the signal may make it go beyond ±1 in some or most cases. As a result, a limiter is added just before saving a WAV file of the single output track 32. The limiter temporarily reduces the gain if the amplitude of the signal or track goes over 1.

The original signal or track is first normalized to an RMS level of $L_{RMS}=-15$ dB:

$$x[n] \leftarrow x[n] \frac{10^{\frac{L_{RMS}}{20}}}{\sqrt{\frac{1}{N}\sum_n x[n]^2}} \quad (68)$$

It is then processed sample by sample to remove the peaks over $L_{limit}=-0.3$ dB. First a peak amplitude is estimated:

$$a_{amplitude} = \begin{cases} a_{attack} & \text{if } |x[n]| < x_{peak}[-1] \\ a_{release} & \text{otherwise} \end{cases} \quad (69)$$

$$x_{peak}[n] = a_{amplitude} x_{peak}[n-1] + (1-a_{amplitude})|x[n]| \quad (70)$$

The Auto-Regressive filter coefficient is found using the specified time constant:

$$a = e^{-\frac{1}{\tau F_a}}$$

The gain to apply is then computed. The gain may only be below one, because reduction of the peaks is desired:

$$\gamma[n] = \min\left(1, \frac{10^{\frac{L_{limit}}{20}}}{x_{peak}[n]}\right) \quad (71)$$

$$a_{gain} = \begin{cases} a_{attack} & \text{if } \gamma[n] < g[n=1] \\ a_{release} & \text{otherwise} \end{cases} \quad (72)$$

$$g[n] = a_{gain} g[n-1] + (1-a_{gain})\gamma[n] \quad (73)$$

The computed gain is then applied to a delayed version of the original signal or track which is determinable by a "look ahead" parameter according to equation (74):

$$y[n] = g[n]x[n-L_{look\_ahead}] \quad (74)$$

As a result, the output signal y[n] is delayed by $L_{look\_ahead}$ compared to the original signal or track, but this may be corrected if desirable.

In an embodiment of the inventive system 10 and/or method 50, the following parameters may be utilized: $L_{RMS}=-15$ dB, $L_{limit}=-0.3$ dB, $\tau_{attack}=0$ s, $\tau_{release}=0.05$ s and $L_{look\_ahead}=0.003$ s×$F_s$.

Figure 19:
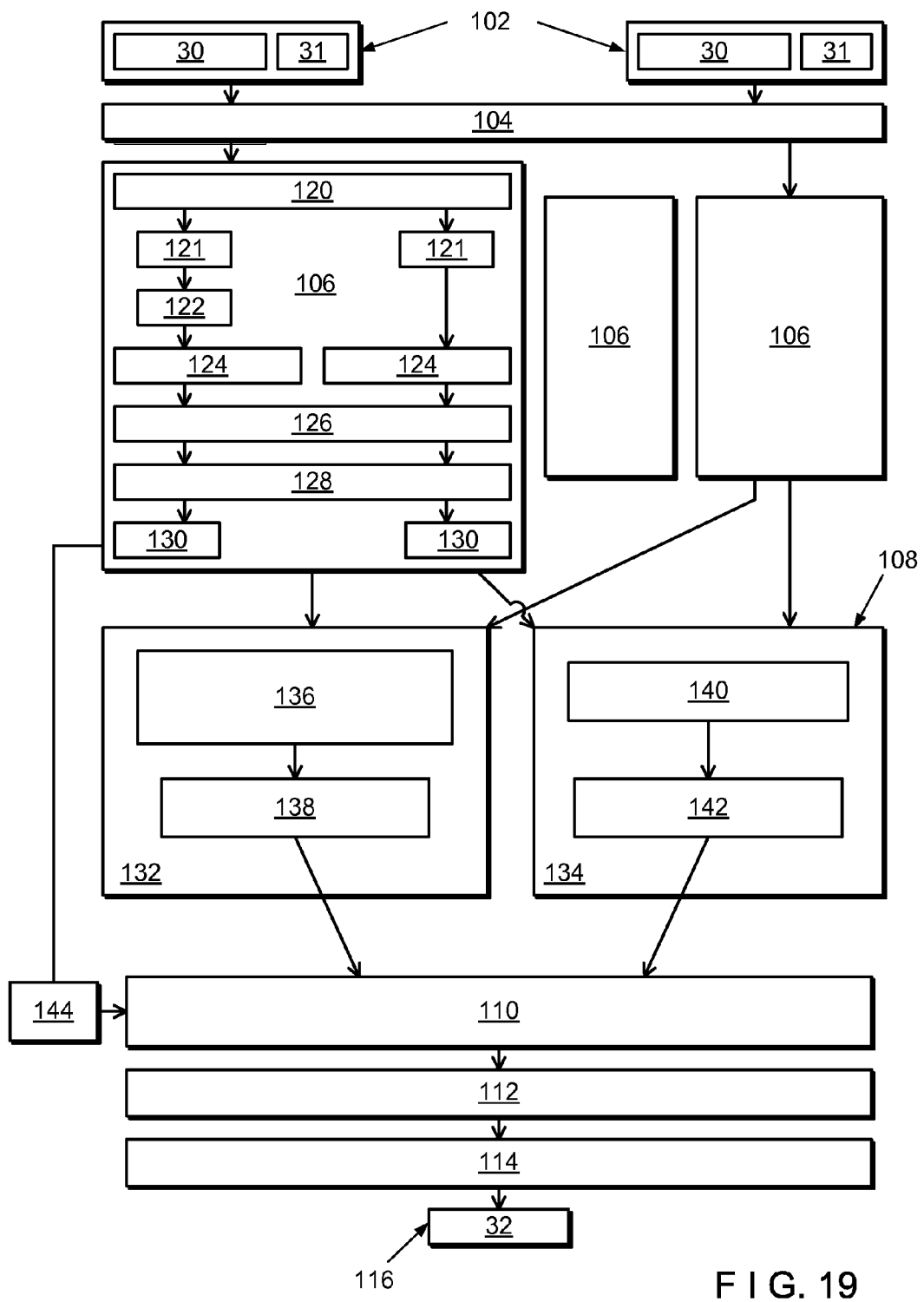
FIG. 19 illustrates a flowchart of a method for analyzing audio characteristics and/or generating a uniform soundtrack from multiple digital sources in an embodiment.

In embodiments, the CPU 14 may execute or initiate the software to perform, execute and/or complete one or more computer-implemented instructions, actions and/or steps associated with a method 100 for analyzing audio characteristics of the input recorded/synchronized audio files 30 and generating a single output file 32 of the same event from the input recorded/synchronized audio files 30 recorded from different multiple digital sources as shown in FIG. 19.

The audio files 30 may be inputted into the CPU 14 for processing upon execution of the computer-implemented software, wherein synchronization information 31 is provided with each audio file 30 as shown at step 102. The method 100 may create an arrangement matrix A which may identify start and end times for the atoms (i.e., blocks) as shown at step 104. The method 100 may process each individual audio file 30 separately as shown at step 106, wherein the processing steps may include subdividing each audio track into a plurality of atoms 121 as shown at step 120. The method 100 may detect one or more of the artefacts present within one or more of the audio files 130 as shown at step 122. In embodiments, the artefact detection may include, but is not limited to, a clipping detection and/or a distortion detection. The method 100 may determine, compute and/or provide a spectrogram for each atom 121 of each audio file 30 as shown at step 124. Further, the method 100 may determine, compute and/or provide an audio file spectrum for each atom 121 of each audio file 30 based on, or from, the computed spectrograms of the atoms 121 of the audio file 30 as shown at step 124. Still further, the method 100 may estimate a cut-off frequency and/or a data compression for each atom 121 of each audio file 30 based on, or from, the audio file spectrums of the atoms 121 of the audio files 30 as shown at steps 128 and 130, respectively.

Next, the method 100 may apply, perform and/or execute a first processing technique 132 or a second processing technique 132 as shown at step 108. When the first processing technique 132 is being applied, performed or executed, the method 100 may "decolour" the audio signals using all available audio files 30 from each atom 121 in time as shown at step 136. Further, the method 100 may detect one or more interferences within each atom 121 and/or each audio file 30 by utilizing one or more binary feature vectors as shown step 138.

When the second processing technique 134 is being applied, performed and/or executed, the method 100 may apply, perform and/or execute at least one common signal extraction with respect to each atom 121 and/or each audio file 30 as shown at step 140. Additionally, the method 100 may subsequently "decolour" the audio signals using all available audio files for each atom 121 in time as shown at step 142.

The method 100 may apply, perform, execute and/or solve one or more the linear programming problems for optimum track selection from the analyzed and/or processed audio files 30 as shown at step 110. As a result, optimization windows for the atoms 121 of the audio files 30 may be determined, identified and/or calculated by solving the one or more linear programming problems.

Alternatively, one or more of the audio files 30 may bypass the first and second processing techniques 132, 134 as shown at step 144. As a result, optimization windows for the one or more audio files 30 may be determined without utilizing the first and second processing techniques 132, 134 as shown at step 110. In an embodiment, after the audio file 30 is subdivided into the atoms 121, the method 100 may calculate, determine and/or identify optimization costs for each atom 121 of each audio file 30 by utilizing one or more quantities, such as, cut-off frequency estimations and/or data compression estimations, estimated during the processing of each audio file 30 via step 106 and then proceed to step 110 as shown at step 144. As a result, the optimization windows for each atom 121 of each audio file 30 may be calculated, determined and/or identified based on the optimization costs for each atom 121 of each audio file 30.

More than one of the atoms 121 of more than one of the audio files 30 may be selected to be merged into the single output file 32 based on the optimization windows determined, identified and/or calculated in step 110. Still further, the method 100 may merge the more than one processed and selected atoms 121 of the more than one of the audio files 30 into the single output file 32 as shown at step 112. Yet still further, the method 100 may apply, perform and/or execute one or more RMS level adjustments for limiting the single output file 32 as shown at step 114. Moreover, the method 100 may generated, produce, create and/or output the single output file 32 as shown at step 116.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

The invention claimed is:

1. A computer-implemented method for analyzing audio characteristics of digital audio files and generating a uniform soundtrack based on more than one of the digital audio files, the method comprising:
    equalizing a content of each input digital audio file such that all input digital audio files are processible as a group, wherein the input digital audio files are storable in a database and comprise a list of original recorded digital audio files from original recorded digital video files that were recorded from at least two different digital sources at the same event and the input digital audio files have previously been synchronized such that exact locations of the input digital audio files within the same event have been determined or identified;
    analyzing audio characteristics of the input digital audio files to detect a content quality of each input digital audio file;
    retrieving highest possible content qualities of the input digital audio files by cleaning the input digital audio files;
    generating a unified soundtrack for one or more portions of the same event by merging more than one of the input digital audio files into a merged digital audio file; and
    outputting at least one selected from the generated unified soundtrack and the merged digital audio file.

2. The method according to claim 1, wherein one or more discontinuities within at least one selected from the outputted unified soundtrack and the outputted merged digital audio file are minimized.

3. The method according to claim 1, wherein the input digital audio files are contained within digital multimedia files that further comprise digital video files that have been previously synchronized with respect to each other.

4. The method according to claim 1, further comprising:
    providing a database comprising the input digital audio tracks.

5. The method according to claim 1, further comprising:
    storing, in a database or a digital memory device, at least one selected from the outputted unified soundtrack and the outputted merged digital audio file.

6. The method according claim 1, further comprising:
    detecting one or more artefacts within one or more of the input digital audio files while analyzing the audio characteristics of the input digital audio files, wherein the one or more artefacts are selected from the group consisting of compression, saturation/distortion, noise, perturbations and combinations thereof.

7. The method according to claim 1, further comprising:
forcing, while equalizing the content, all input digital audio files to have a same sampling frequency.

8. A computer-implemented method for analyzing audio characteristics of digital audio files recorded at a same event and generating a uniform soundtrack based on more than one of the digital audio files, the method comprising:
accessing input digital audio files that are storable in a database and comprise a list of original recorded digital audio files from original recorded digital video files that were recorded from at least two different digital sources at the same event, wherein the input digital audio files have previously been synchronized such that exact locations of the input digital audio files within the same event have been determined or identified;
subdividing each input digital audio file in a plurality of atoms;
estimating at least one selected from a cut-off frequency and a data compression for each atom of each input digital audio file based on the plurality of atoms of each input digital audio file;
selecting atoms of the input digital audio files for generating an output digital audio file based on determined optimization windows for each atom of each input digital audio file;
generating at least one portion of the uniform soundtrack by merging the selected atoms of the input digital audio files into the output digital audio file; and
outputting the generated at least one portion of the uniform soundtrack.

9. The method according to claim 8, further comprising:
determining the optimization windows for each atom of each input digital audio file based on determined optimization costs for each atom, wherein the determined optimization costs are determined by utilizing at least one selected from the estimated cut-off frequency and the estimated data compression for each input digital audio file.

10. The method according to claim 8, further comprising:
detecting, after each input digital audio file is subdivided, one or more artefacts associated with each atom of each input digital audio file.

11. The method according to claim 10, wherein the one or more artefacts are selected from the group consisting of compression, saturation/distortion, noise, perturbations and combinations thereof.

12. The method according to claim 8, further comprising:
determining a spectrogram of each atom of each input digital audio file.

13. The method according to claim 12, further comprising:
determining an audio file spectrum of each atom of each input digital audio file based on the determined spectrogram of each atom of each input digital audio file.

14. The method according to claim 13, further comprising:
estimating a cut-off frequency for each atom of each input digital audio file based on the determined audio file spectrum of each atom of each input digital audio file.

15. The method according to claim 14, further comprising:
estimating a data compression for each atom of each input digital audio file.

16. The method according to claim 15, wherein the determined optimization windows for each atom is based on at least one selected from the estimated cut-off frequency and the estimated data compress for each atom of each input digital audio file.

17. The method according to claim 8, wherein the determined optimization windows for each atom is based on a processing technique comprising utilizing all available audio files for each atom in time for decoloring audio signals associated with each atom of each input digital audio file.

18. The method according to claim 17, wherein the processing technique further comprises a common signal extraction or an interference detection using at least one binary feature vector.

19. The method according to claim 8, further comprising:
providing a database comprising the input digital audio files.

20. The method according to claim 8, further comprising:
storing, in a database or a digital memory device, the outputted generated at least one portion of the uniform soundtrack.

* * * * *